US008160568B2

(12) United States Patent
Kim et al.

(10) Patent No.: US 8,160,568 B2
(45) Date of Patent: Apr. 17, 2012

(54) MOBILE TERMINAL AND METHOD FOR REMOTE-CONTROLLING THEREOF

(75) Inventors: Jong-Hwan Kim, Gyeonggi-do (KR); Woo-Hyun Paik, Gyeonggi-Do (KR); Hyung-Hoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/339,724

(22) Filed: Dec. 19, 2008

(65) Prior Publication Data

US 2009/0298469 A1  Dec. 3, 2009

(30) Foreign Application Priority Data

May 27, 2008 (KR) .................. 10-2008-0049347
May 28, 2008 (KR) .................. 10-2008-0049513

(51) Int. Cl.
*H04M 1/66* (2006.01)
*H04M 3/00* (2006.01)
(52) U.S. Cl. ........ 455/420; 455/418; 455/419; 455/410; 455/411
(58) Field of Classification Search ........... 455/418–420
See application file for complete search history.

(56) References Cited

U.S. PATENT DOCUMENTS

| 5,734,331 | A  | * | 3/1998 | Makino ................ 340/7.51 |
| 7,099,658 | B2 | * | 8/2006 | Kim ..................... 455/415 |
| 7,389,123 | B2 | * | 6/2008 | Rydgren et al. ......... 455/550.1 |
| 2002/0021219 | A1 | * | 2/2002 | Edwards ............... 340/573.1 |
| 2003/0139175 | A1 | * | 7/2003 | Kim ..................... 455/419 |
| 2004/0157612 | A1 | * | 8/2004 | Kim ..................... 455/445 |
| 2004/0203601 | A1 | * | 10/2004 | Morriss et al. .......... 455/411 |
| 2005/0075072 | A1 | * | 4/2005 | Apitzsch ............... 455/41.2 |
| 2005/0096030 | A1 |   | 5/2005 | Boyd et al. |
| 2005/0104717 | A1 | * | 5/2005 | Kaplan ................. 340/5.74 |
| 2007/0149189 | A1 | * | 6/2007 | Yang et al. ............. 455/428 |
| 2008/0070561 | A1 |   | 3/2008 | Keum et al. |

FOREIGN PATENT DOCUMENTS

CN  1456017  11/2003
WO  WO 2005/109658  11/2005

OTHER PUBLICATIONS

European Search Report dated Oct. 5, 2009.

* cited by examiner

*Primary Examiner* — Marisol Figueroa
(74) *Attorney, Agent, or Firm* — KED & Associates LLP

(57) ABSTRACT

A mobile terminal may be remote controlled by setting a condition for the mobile terminal to enter a remote-control mode, receiving a call connection request, and entering the remote-control mode when the call connection request is received at the mobile terminal and the call connection request corresponds to the set condition. A function control signal may be received by the mobile terminal while the mobile terminal is in the entered remote-control mode, and a remote-control function may be performed that corresponds to the received function control signal.

33 Claims, 41 Drawing Sheets

FIG. 26
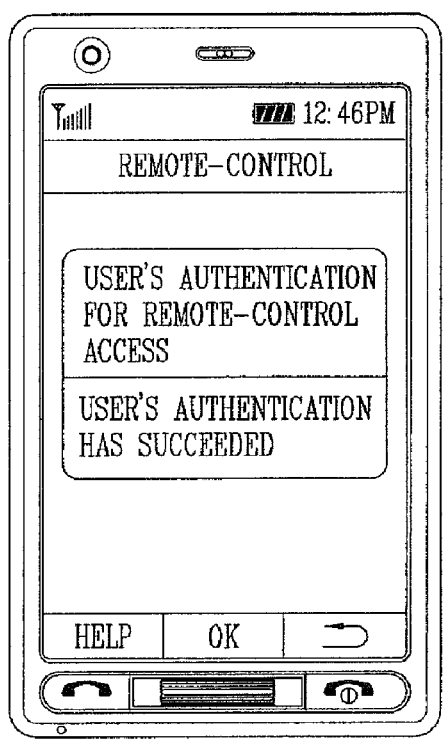
(a)
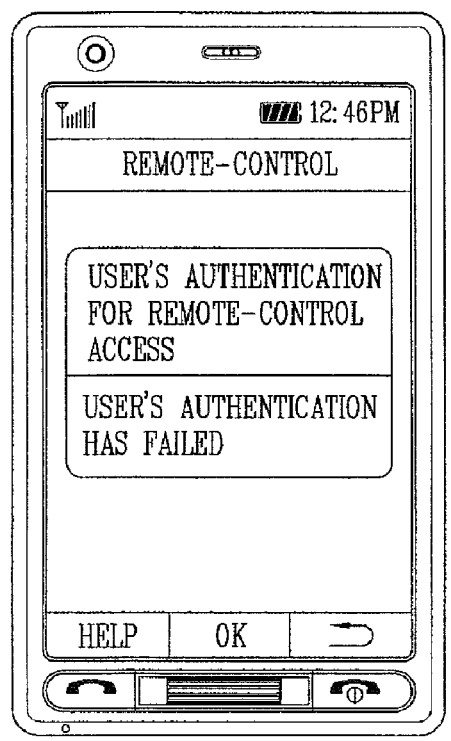
(b)

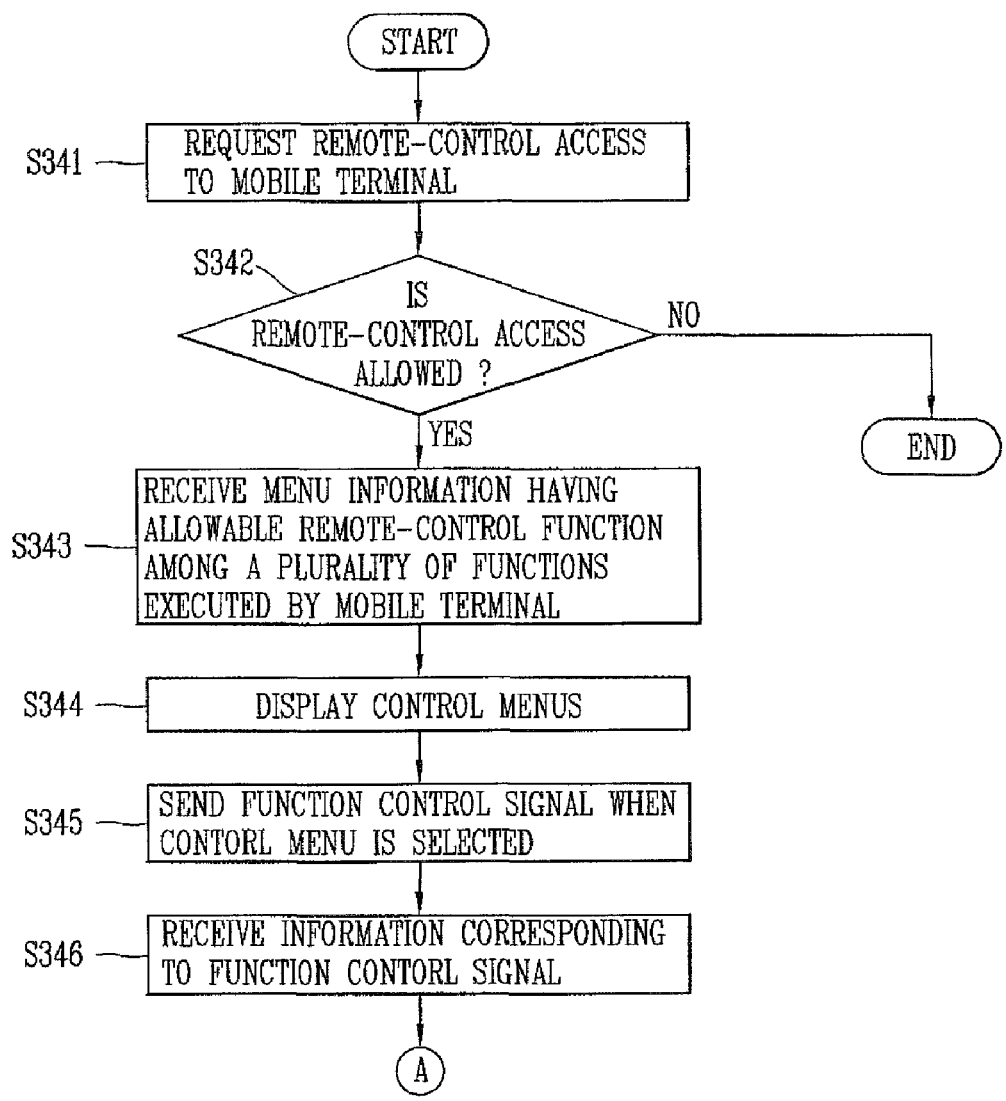

(a)  (b)

MOBILE TERMINAL AND METHOD FOR REMOTE-CONTROLLING THEREOF

The present application claims priority from Korean Application No. 10-2008-0049347, filed May 27, 2008 and Korean Application No. 10-2008-0049513, filed May 28, 2008, the subject matters of which are hereby incorporated by reference.

BACKGROUND

1. Field

Embodiments of the present invention may relate to a mobile terminal that may be remote-controlled in a circumstance relating to a call connection request, and a method for remote-controlling thereof.

2. Background

A mobile terminal may serve as portable electronic devices having one or more functions such as audio and video calls, information input/output, and data storage, for example.

Mobile terminals may provide services in addition to basic call service, such as serving as multimedia players including complicated functions such as capturing photos or moving images, reproducing music or moving image files, playing games, receiving broadcasting programs, etc.

Hardware and software may be provided in order to implement complicated functions of the multimedia players. A User Interface may allow a user to easily and conveniently search or select functions.

BRIEF DESCRIPTION OF THE DRAWINGS

Arrangements and embodiments may be described in detail with reference to the following drawings in which like reference numerals refer to like elements and wherein:

FIGS. 26A and 26B are examples showing whether a remote-control access has been successfully allowed using an authentication signal;

FIG. 27 is a flowchart for remote-controlling a mobile terminal according to an embodiment of the present invention;

DETAILED DESCRIPTION

Figure 1:
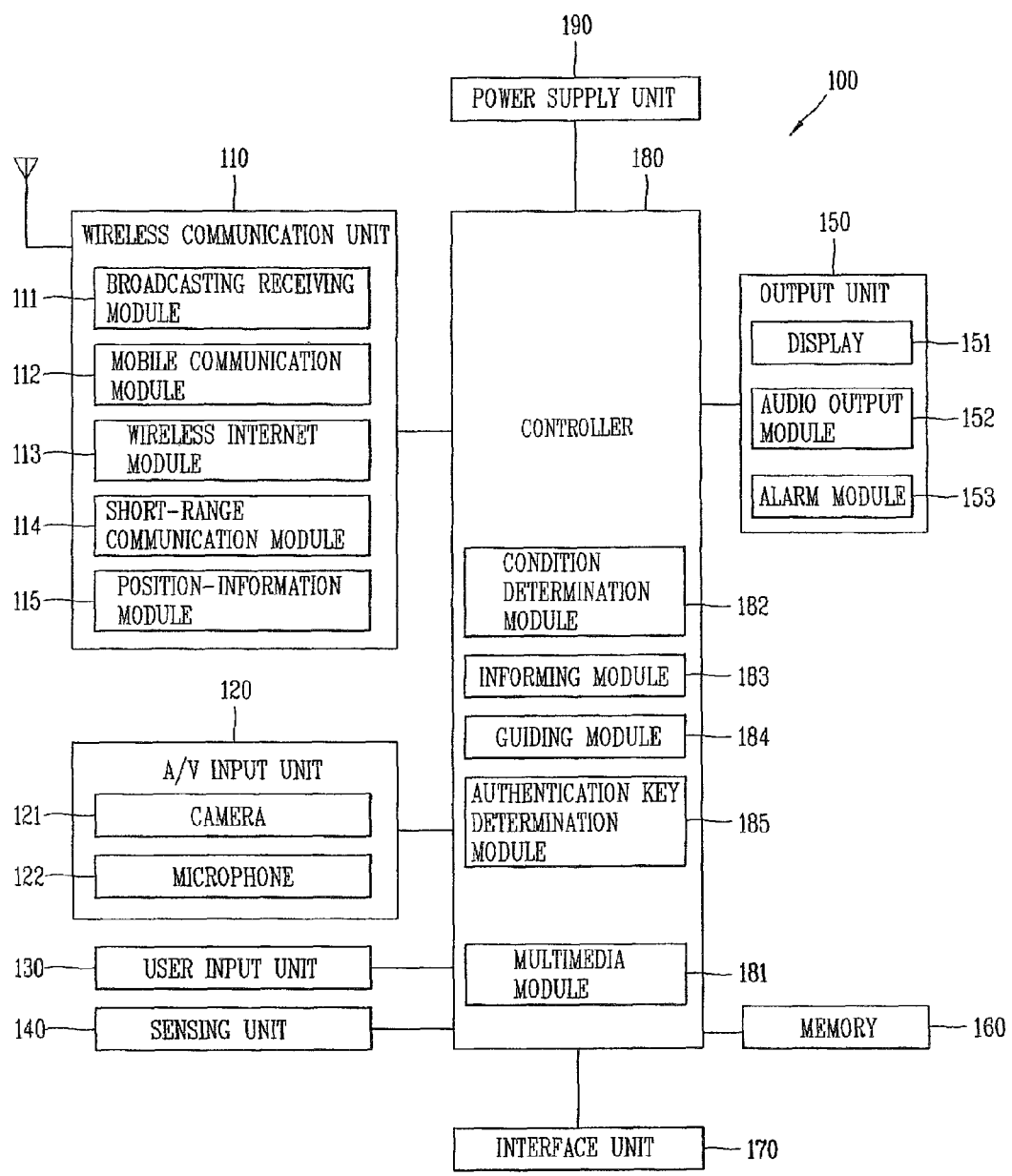
FIG. 1 is a block diagram of a mobile terminal according to an example arrangement.

FIG. 1 is a block diagram of a mobile terminal according to an example arrangement. Other arrangements may also be provided.

FIG. 1 shows that a mobile terminal 100 may include a wireless communication unit 110, a user input unit 130, a sensing unit 140, an output unit 150, a memory 160 (or storage unit), an interface unit 170, a controller 180, and a power supply unit 190. The mobile terminal may also be implemented with a smaller or larger number of components than as shown in FIG. 1.

The wireless communication unit 110 may include one or more components that permit wireless communication between the mobile terminal 100 and a wireless communication system or network within which the mobile terminal 100 is located. For example, the wireless communication unit 110 may include at least one of a broadcast receiving module 111, a mobile communication module 112, a wireless internet module 113, a short-range communication module 114, and a position-information module 115 (or GPS module).

The broadcast receiving module 111 may receive a broadcast signal and/or broadcast related information from an external broadcast managing entity via a broadcast channel. The broadcast channel may include a satellite channel, a terrestrial channel and/or some other type of communicating channel. The broadcast managing entity may be a system that transmits a broadcast signal and/or broadcast related information. Examples of broadcast related information include information associated with a broadcast channel, a broadcast program, a broadcast service provider, etc. The broadcast related information may include an electronic program guide (EPG) of digital multimedia broadcasting (DMB) and/or electronic service guide (ESG) of digital video broadcast-handheld (DVB-H). In addition, the broadcast signal may be a TV broadcast signal, a radio broadcast signal, and/or a data broadcast signal, etc. The broadcast signal may further include a broadcast signal combined with a TV or radio broadcast signal.

The broadcast receiving module 111 may receive broadcast signals transmitted from various types of broadcast systems. For example, the broadcasting systems may include the digital multimedia broadcasting-terrestrial (DMB-T), the digital multimedia broadcasting-satellite (DMB-S), the digital video broadcast-handheld (DVB-H), the data broadcasting system known as media forward link only (MediaFLO®) and the integrated services digital broadcast-terrestrial (ISDB-T) system. The receiving of multicast signals may also be provided. Furthermore, data received by the broadcast receiving module 111 may be stored in the memory 160, for example.

The mobile communication module 112 may transmit/receive wireless signals to/from one or more network entities (e.g., base station, Node-B). The signals may represent audio, video, multimedia, control signaling, and data, etc.

The wireless Internet module 113 may support Internet access for the mobile terminal. The wireless Internet module 113 may be internally or externally coupled to the terminal.

The short-range communication module 114 may facilitate relatively short-range communications. Suitable technologies for implementing this module may include radio frequency identification (RFID), infrared data association (IrDA), ultra-wideband (UWB), as well as networking technologies such as Bluetooth and ZigBee.

The position-location module 115 may also be provided in the wireless communication unit 110 to identify or otherwise obtain the location or position of the mobile terminal 100. The position-location module 115 may be provided using global positioning system (GPS) components that cooperate with associated satellites, network components, and/or combinations thereof.

As shown in FIG. 1, the mobile terminal 100 may also include an audio/video (A/V) input unit 120 that provides audio or video signals to the mobile terminal 100. The A/V input unit 120 may include a camera 121 and a microphone 122. The camera 121 may receive and process image frames of still pictures or video. The microphone 122 may receive an external audio signal while the portable device is in a particular mode, such as a phone call mode, recording mode and/or voice recognition mode. The received audio signal may then be processed and converted into digital data. The portable device, and in particular, the A/V input unit 120, may include noise removing algorithms to remove noise generated in the course of receiving the external audio signal. Data generated by the A/V input unit 120 may be stored in the memory 160, utilized by the output unit 150, and/or transmitted via one or more modules of the communication unit 110. Two or more microphones and/or cameras may also be used.

The mobile terminal 100 also further includes the user input unit 130 that generates input data responsive to user manipulation of an associated input device or devices. Examples of such devices may include a keypad, a dome switch, a touchpad (e.g., static pressure/capacitance), a jog wheel and/or a jog switch. The user input unit 130 may be configured as a touchpad in cooperation with a touch screen display, as will be described below in more detail.

The sensing unit 140 may also be provided in the mobile terminal 100 to provide status measurements of various aspects of the mobile terminal 100. For example, the sensing unit 140 may detect an open/close status of the mobile terminal 100, a relative positioning of components (e.g., a display and keypad) of the mobile terminal 100, a change of position of the mobile terminal 100 or a component of the mobile terminal 100, a presence or absence of user contact with the mobile terminal 100, an orientation or acceleration/deceleration of the mobile terminal 100, etc. When the mobile terminal 100 is a slide-type mobile terminal, the sensing unit 140 may sense whether a sliding portion of the mobile terminal 100 is open or closed. The sensing unit 140 may also sense the presence or absence of power provided by the power supply unit 190, the presence or absence of a coupling or other connection between the interface unit 170 and an external device, etc.

The interface unit 170 may couple the mobile terminal 100 with external devices, such as wired/wireless headphones, external chargers, power supplies, storage devices configured to store data (e.g., audio, video, pictures, etc.), earphones, and microphones, etc. In addition, the interface unit 170 may use a wired/wireless data port, a card socket (e.g., for coupling to a memory card, a subscriber identity module (SIM) card, a user identity module (UIM) card, a removable user identity module (RUIM) card, etc.), audio input/output ports and/or video input/output ports, for example.

The output unit 150 may include various components that support output requirements of the mobile terminal 100. The mobile terminal 100 also includes a display 151 that visually displays information associated with the mobile terminal 100. For example, if the mobile terminal 100 is operating in a phone call mode, the display 151 may provide a user interface or a graphical user interface that includes information associated with placing, conducting, and/or terminating a phone call. As another example, if the mobile terminal 100 is in a video call mode or a photographing mode, the display 151 may additionally or alternatively display images that are associated with these modes.

The display 151 may also include a touch screen working in cooperation with an input device, such as a touchpad. This configuration may permit the display 151 to function both as an output device and an input device. The display 151 may also be implemented using display technologies including a liquid crystal display (LCD), a thin film transistor-liquid crystal display (TFT-LCD), an organic light-emitting diode display (OLED), a flexible display and a three-dimensional display, for example.

The mobile terminal 100 may also include one or more displays. A two-display embodiment may include an internal display (viewable when the terminal is in an opened position) and an external display (viewable in both open and closed positions).

FIG. 1 further shows the output unit 150 includes an audio output module 152 that supports audio output requirements of the mobile terminal 100. The audio output module 152 may be implemented using one or more speakers, buzzers, other audio producing devices, and/or combinations thereof The audio output module 152 may function in various modes including a call-receiving mode, a call-placing mode, a recording mode, a voice recognition mode and/or a broadcast reception mode. During operation, the audio output module 152 may output audio relating to a particular function (e.g., call received, message received, and errors).

The output unit 150 may further include an alarm module 153 to signal or otherwise identify occurrence of a particular event associated with the mobile terminal 100. Alarm events may include a call received, a message received and/or user input received. An example of such an output may include providing tactile sensations (e.g., vibration) to a user. For example, the alarm module 153 may vibrate responsive to the mobile terminal 100 receiving a call or message. As another example, a vibration may be provided by the alarm module 153 responsive to receiving user input at the mobile terminal 100, and thereby providing a tactile feedback mechanism. The various outputs provided by the components of the output unit 150 may be separately performed, or such output may be performed using any combination of such components.

The memory 160 may store various types of data to support processing, control, and storage requirements of the mobile terminal 100. The data may include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The mobile terminal 100 may also include the controller 180 to control the overall operations of the mobile terminal 100. For example, the controller 180 may perform control and processing associated with voice calls, data communications, instant message communications, video calls, camera operations and recording operations. As shown in FIG. 1, the controller 180 may include a multimedia module 181 for providing multimedia playback functions. The multimedia module 181 may be configured as part of the controller 180, or may be implemented as a separate component.

The controller 180 may further include a condition determination module 182, an informing module 183, a guiding module 184 and an authentication key determination module 185.

The power supply unit 190 may provide power for the various components for the portable device. The provided power may be internal power, external power, and/or a combination thereof.

The above arrangements may be implemented in a computer-readable medium using, for example, computer software, hardware, or some combination thereof.

For a hardware implementation, the above described arrangements may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof Arrangements may also be implemented by the controller 180.

For a software implementation, the above described arrangements may be implemented with separate software modules, such as procedures and functions, each of which may perform one or more of the functions and operations described herein. The software codes may be implemented with a software application written in any suitable programming language and may be stored in a memory (e.g., the memory 160), and executed by a controller or processor (e.g., the controller 180).

The mobile terminal 100 may also be implemented in a variety of different configurations, such as a folder-type, a slide-type, a bar-type, a rotational-type, a swing-type and/or combinations thereof. The following disclosure may primarily relate to a slide-type mobile terminal. However, the teachings apply to other types of terminals.

Figure 2:
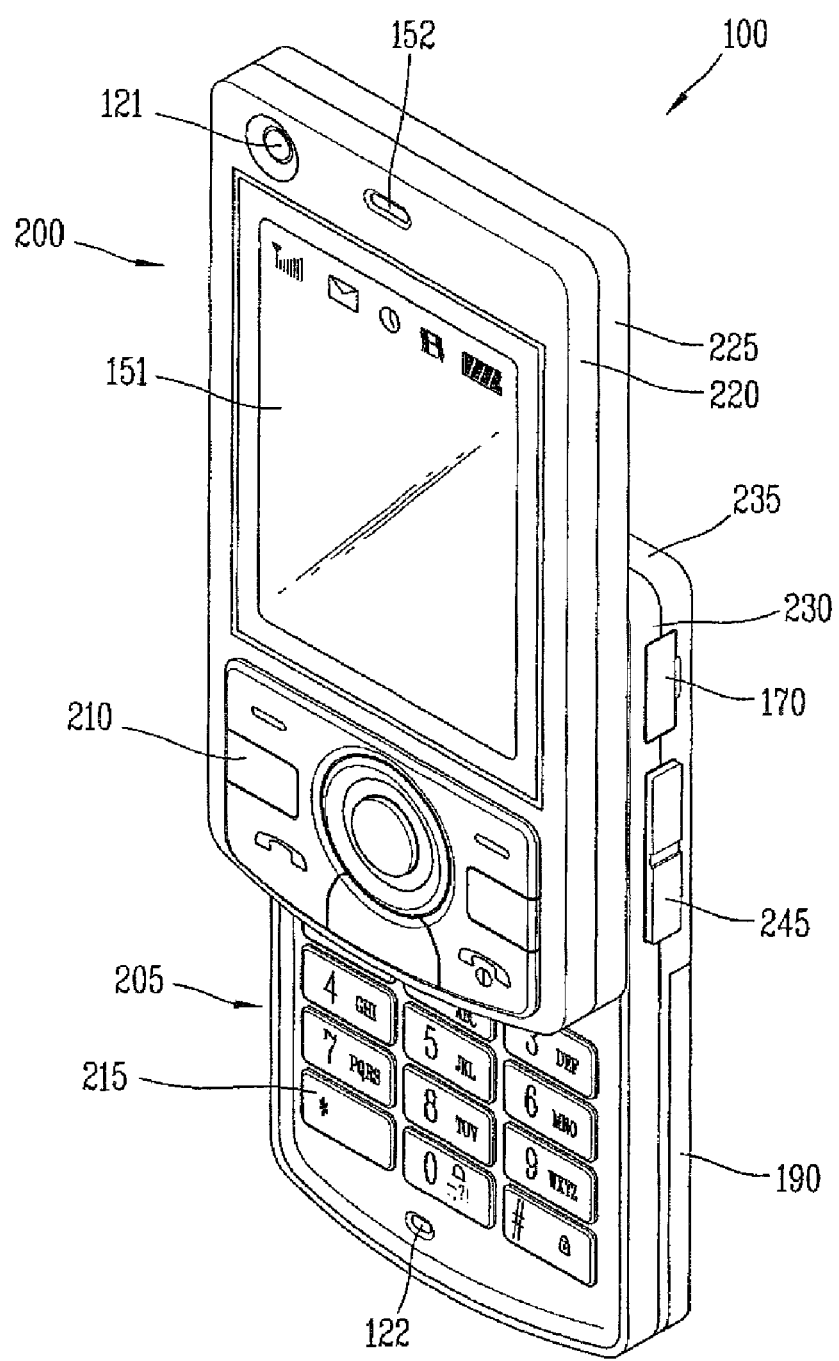
FIG. 2 is a front view of the mobile terminal according to an example arrangement.

FIG. 2 is a front view of the mobile terminal 100 according to an example arrangement. Other arrangements may also be provided.

As shown in FIG. 2, the mobile terminal 100 may include a first body 200 configured to slidably cooperate with a second body 205.

A state in which the first body 200 overlaps the second body 205 may be called a closed state or a closed configuration/position. A state in which the first body 200 exposes at least one part of the second body 205 may be called an open state or an open configuration/position.

The mobile terminal 100 may function in a standby mode when in the closed position, and may function in a call mode when in the open position. However, the call mode may be converted into a standby mode by a user's manipulation or a lapse of a certain time.

A case (i.e., a casing, a housing cover) forming an appearance of the first body 200 may be formed by a first front case 220 and a first rear case 225. Each of the electronic components may be mounted to a space formed by the first front case 220 and the first rear case 225. One or more intermediate cases may be provided between the first front case 220 and the first rear case 225. The front and rear cases 220, 225 may be formed by injection-molding of a synthetic resin, or may be formed using metallic material such as stainless steel (STS) and titanium (Ti).

The display 151, the audio output module 152, the camera 121, and/or a first user input unit 210 may be provided on the first front case 220.

The display 151 may be a Liquid Crystal Display (LCD) or Organic Light Emitting Diodes (OLED). The display 151 may also be configured as a touch screen having an underlying touchpad that generates signals responsive to user contact with the touch screen.

The audio output module 152 may be a speaker. The camera 121 may capture still images or moving images of a user, etc.

A case of the second body 205 may be formed by a second front case 230 and a second rear case 235.

A second user input unit 215 may be provided on a front surface of the second front case 230.

A third user input unit 245, the microphone 122, and the interface unit 170 may be provided on at least one of the second front case 230 and the second rear case 235.

The first to third user input units 210, 215 and 245 may be referred to as the user input unit 130, and may be implemented in a user's tactile manner. For example, the user input unit 130 may be implemented as a dome switch or a touch pad that can receive commands or information based on a user's push or touch manner, or the user input unit 130 may be implemented as a jog wheel or a jog switch.

The first user input unit 210 may serve to input commands such as start, stop, and scroll commands, and the second user input unit 215 may serve to input numbers, characters, or symbols. The third user input unit 245 may serve as hot keys to activate specific functions inside the mobile terminal.

The microphone 122 may receive a user's voice, another sound, etc.

The interface unit 170 may serve as a passage through which the mobile terminal can exchange data with external devices. The interface unit 170 may be implemented by wire or by radio, and may include one of an access port to an earphone, a short-range communication port (e.g., IrDA port), a Bluetooth port, a wireless LAN port, and a power supply port for supplying power to the mobile terminal.

The interface unit 170 may be a card socket for receiving an external card such as a subscriber identification module (SIM), a User Identification Module (UIM), and a memory card for storing information.

The power supply unit 190 may be mounted to the second rear case 235 and may supply power to components of the mobile terminal 100. The power supply unit 190 may be detachably mounted to the second rear case 235 as a chargeable battery.

Figure 3:
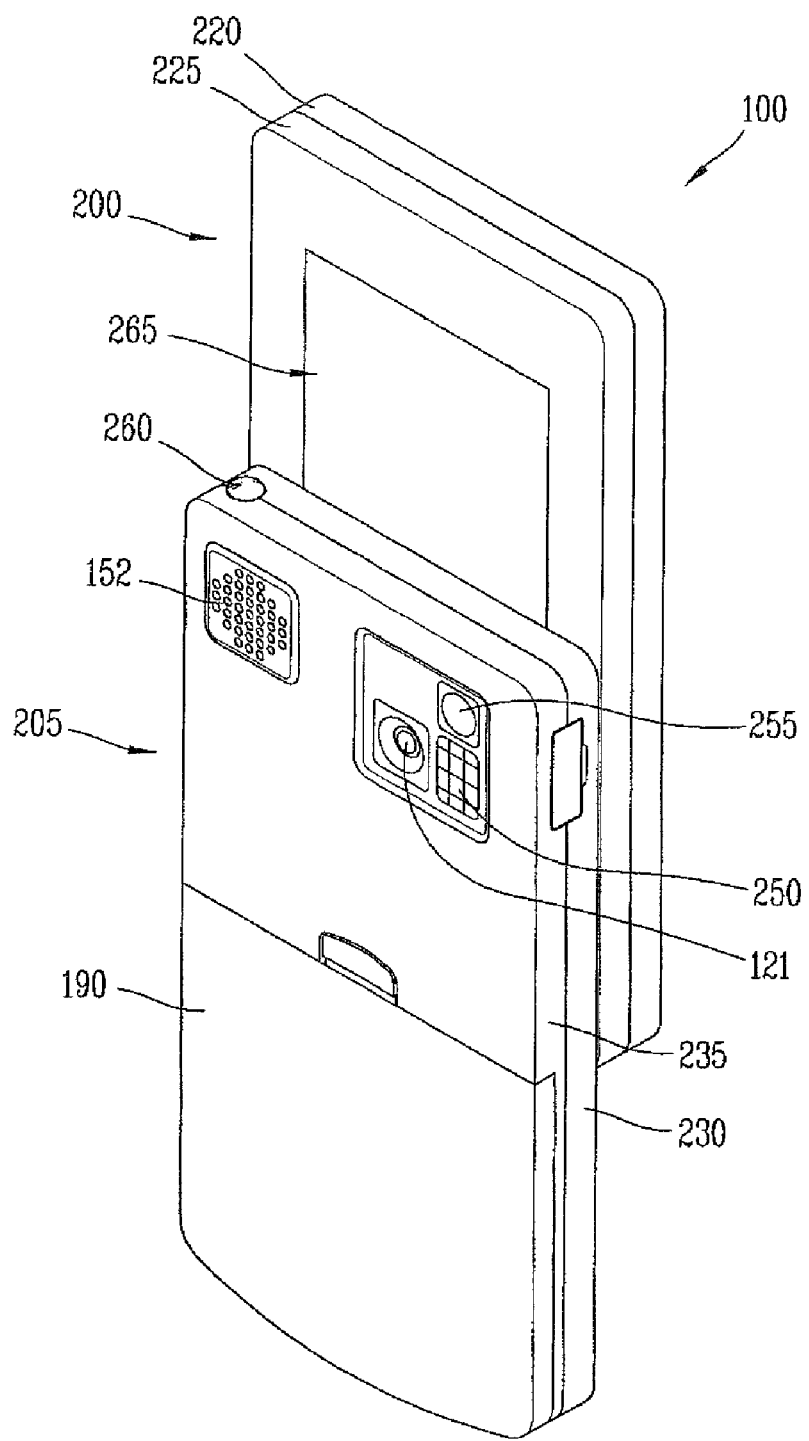
FIG. 3 is a rear view of the mobile terminal according to an example arrangement.

FIG. 3 is a rear view of the mobile terminal according to an example arrangement. Other arrangements may also be provided.

As shown in FIG. 3, the second body 205 may include the camera 121, a flash 250 and a mirror 255. The flash 250 may operate in conjunction with the camera 121 of the second body 205. The mirror 255 may assist a user to position the camera 121 in a self-portrait mode. The camera 121 of the second body 205 may face a direction opposite to a direction faced by the camera 121 of the first body 200.

The cameras 121 of the first and second bodies 200 and 205 may have the same capabilities or different capabilities. For example, the camera 121 of the first body 200 may operate with a relatively lower resolution than the camera 121 of the second body 205. Such an arrangement may work well during a video conference call, for example, in which reverse link bandwidth capabilities may be limited. The relatively higher resolution of the camera 121 of the second body 205 may be useful for obtaining higher quality pictures for later use.

The second rear case 235 may also include the audio output module 152. The audio output modules 152 of the first and second bodies 200 and 205 may cooperate together to provide stereo output. Either or both of the audio output modules 152 may be configured to operate as a speakerphone.

The mobile terminal 100 may also include a broadcast signal receiving antenna 260 located at one side of the second rear case 235. The antenna 260 may be installed at the second body 205 so as to be drawn-out. The rear case 225 of the first body 200 may include a slide module 265 in which one part slidably couples with a corresponding slide module of the second body 205. Another part of the slide module 265 may be provided at the second front case 230 of the second body 205.

The second camera 121 may be provided at the second body 205. However, the position of the second camera 121 is not limited to the above description. For example, at least one of the components described above as being provided at the second rear case 235 may also be provided on the first body 200 such as on the first rear case 225. Components at the first rear case 225 in the closed configuration can be protected by the second body 205. Further, the camera 121 of the first body 200 may be provided without the camera 121 of the second body 205. The camera 121 of the first body 200 may be rotatably formed to capture an object that can be captured by the camera 121 of the second body 205.

The mobile terminal 100 of FIGS. 1 to 3 may operate within a communication system that transmits data via frames or packets, including both wireless and wireline communication systems, and satellite-based communication systems.

Communication systems where the mobile terminal can operate will now be described with reference to FIG. 4.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example, the further description may relate to a CDMA communication system, although the teachings may apply to other systems.

Figure 4:
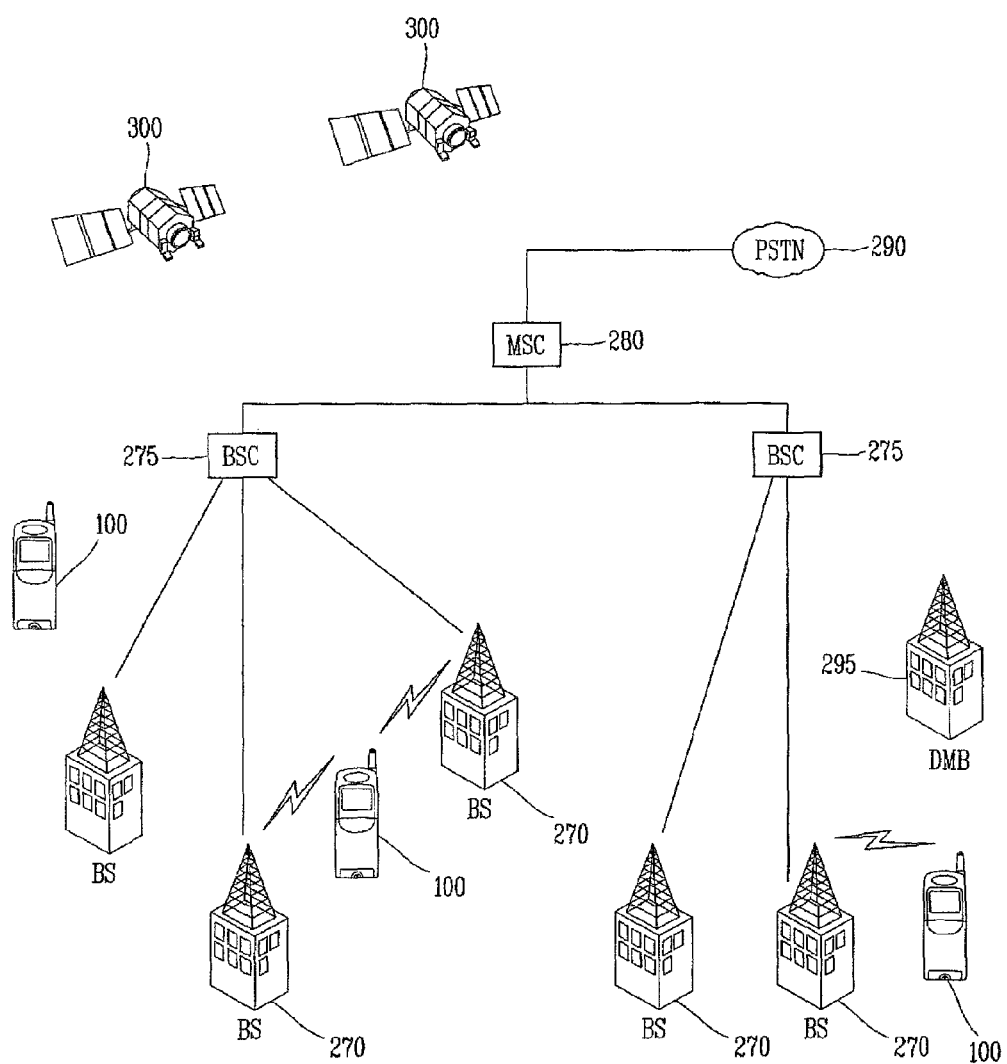
FIG. 4 illustrates a communication system where a mobile terminal can operate.

As shown in FIG. 4, a CDMA wireless communication system may include a plurality of mobile terminals 100, a plurality of base stations (BS) 270, a plurality of base station controllers (BSC's) 275, and a mobile switching center (MSC) 280. The MSC 280 may interface with a Public Switched Telephone Network (PSTN) 290, and the MSC 280 may interface with the BSCs 275. The BSCs 275 may be coupled to the base stations 270 via backhaul lines. The backhaul lines may be configured in accordance with any of several interfaces including E1/T1, ATM, IP, PPP, Frame Relay, HDSL, ADSL, or xDSL, for example. Further, the system shown in FIG. 4 may include two or more BSCs 275.

Each of the base stations 270 may include one or more sectors, each sector having an omni-directional antenna or an antenna pointed in a particular direction radially away from the base station 270. Alternatively, each sector may include two or more antennas for diversity reception. Each base station 270 may support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as Base Station Transceiver Subsystems (BTSs). The term 'base station' may refer collectively to a BSC 275, and one or more base stations 270. The base stations may also be denoted as cell sites. Alternatively, individual sectors of a given base station 270 may also be referred to as cell sites.

FIG. 4 also shows a Broadcasting Transmitter (BT) 295 that may send broadcasting signals to the mobile terminals 100 operating within the system. The broadcast receiving module 111 (FIG. 1) provided at the mobile terminal 100 may receive broadcast signals transmitted by the BT 295.

FIG. 4 further shows global positioning system (GPS) satellites 300. Such satellites facilitate locating the position of some or all of the mobile terminals 100. FIG. 4 shows two satellites, although positioning information may be obtained with greater or fewer satellites. In addition, the position-information module 115 (FIG. 1) may cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally provide satellite DMB transmissions.

During operation of the wireless communication system, the base stations 270 may receive sets of reverse-link signals from the mobile terminals 100. The mobile terminals 100 may engage in calls, messaging, and other communications. In addition, each reverse-link signal received by a given base station 270 may be processed within that base station 270, and the resulting data may be forwarded to an associated BSC 275. The BSC 275 may provide call resource allocation and mobility management functionality including soft handoffs between the base stations 270. The BSCs 275 may also route the received data to the MSC 280, which provides additional routing services for interfacing with the PSTN 290. The PSTN 290 may interface with the MSC 280, and the MSC 280 may interface with the BSCs 275. The BSCs 275 may also control the base stations 270 to transmit sets of forward-link signals to the mobile terminals 100.

An Internet Protocol (IP)-based mobile communication system will now be described. In a Internet Protocol (IP)-based wireless communication network, the mobile terminal may communicate with other end users (e.g., other wireless mobile terminals, fixed terminals, etc.) through a wireless interface. The mobile terminal may access a wireless access network of a mobile communication system for connection, configuration, and control of wireless links.

The IP-based wireless access network may include a base station, a control station, and a switching network. IP data packets for traffics of a counter communication node (Internet end user), and IP data packets of access control signals may be transmitted through a wireless access network between equipment of the network. In a mobile communication system, a wireless access network may be implemented for permanent connection between the base station and the control station. The node may indicate a device mounted with the Internet Protocol layer.

In the IP-based wireless access network, not only the control station but also a plurality of the base stations may be regarded as host nodes of the IP-based wireless access network. The control station and the base stations may be connected to one another through a plurality of layer 2 and 3 switching devices connected to one another or to routers.

The control station and the base stations may be connected to the core network through an external router such as an edge router.

The wireless access network may allow not only communication between the plurality of control stations, but also communication between the base station and the corresponding control station. In the IP-based wireless access network, one router may be connected to a layer 3 switching device, and one router or layer 3 switching device may be connected to one or more layer 2 switching device, thereby implementing a network for relaying communication between host nodes.

Figure 5:
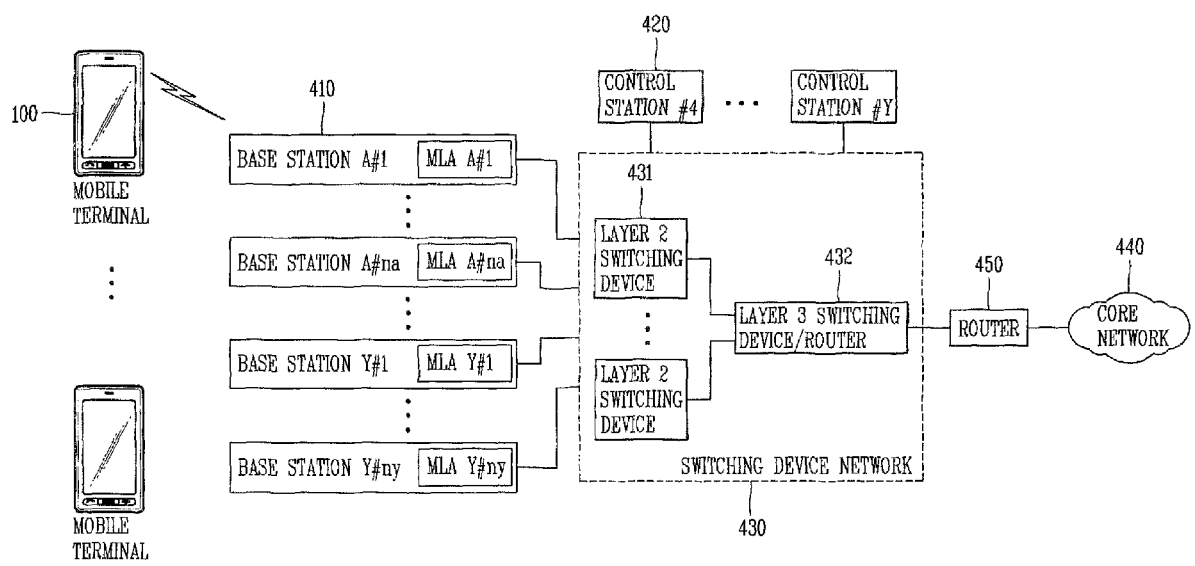
FIG. 5 is a view showing a configuration of an Internet Protocol-based mobile communication system applied to a mobile terminal.

FIG. 5 is a view showing a configuration of an Internet Protocol-based mobile communication system applied to a mobile terminal.

As shown in FIG. 5, the IP-based mobile communication system may include the mobile terminal 100, a base station 410, a control station 420, and a switching device network 430. The switching device network 430 may communicate via a router 450 with a core network 440. The system may include a plurality of base stations and a plurality of control stations.

The mobile terminal 100 may access a local wireless access network having limited users, thereby receiving a wireless access service.

The base station 410 may support wireless access for the local wireless access network. The base station 410 may include a transceiver for performing a radio frequency (RF) signal process with respect to wireless data. The base station 410 may demodulate an intermediate frequency (IF) data signal into a baseband data signal, and send the data signal to the control station 420 through a corresponding channel, thereby routing the data signal to a corresponding destination. The base station 410 may process traffic occurring when allocating wireless resources such as channels received from the control station 420.

The control station 420 may allocate and manage local wireless resources for the local wireless access network through a plurality of call controllers. The plurality of call controllers included in the control station 420 may be provided with a wireless call access protocol, and may logically perform a call control service between the mobile terminal 100 and an external control station, or between the mobile terminal 100 and the core network 440. The control station 420 may perform a wireless call access function for mobility between the base stations. The mobile terminal 100 may receive a call control service request message through the plurality of base stations 410, and the core network 440 may receive a call control service request message through upper services such as session control, call control, mobility control, and additional service control.

The switching device network 430 may switch and route control signal data and traffic data that are implemented in the form of baseband IP packet data having destination addresses according to call control processes. The switching device network 430 may include one or more switching devices. In FIG. 5, the switching device network 430 may include a plurality of layer 2 switching devices 431, and a layer 3 switching device 432.

A method for remote-controlling the mobile terminal 100 will now be described with reference to FIG. 6.

Figure 6:
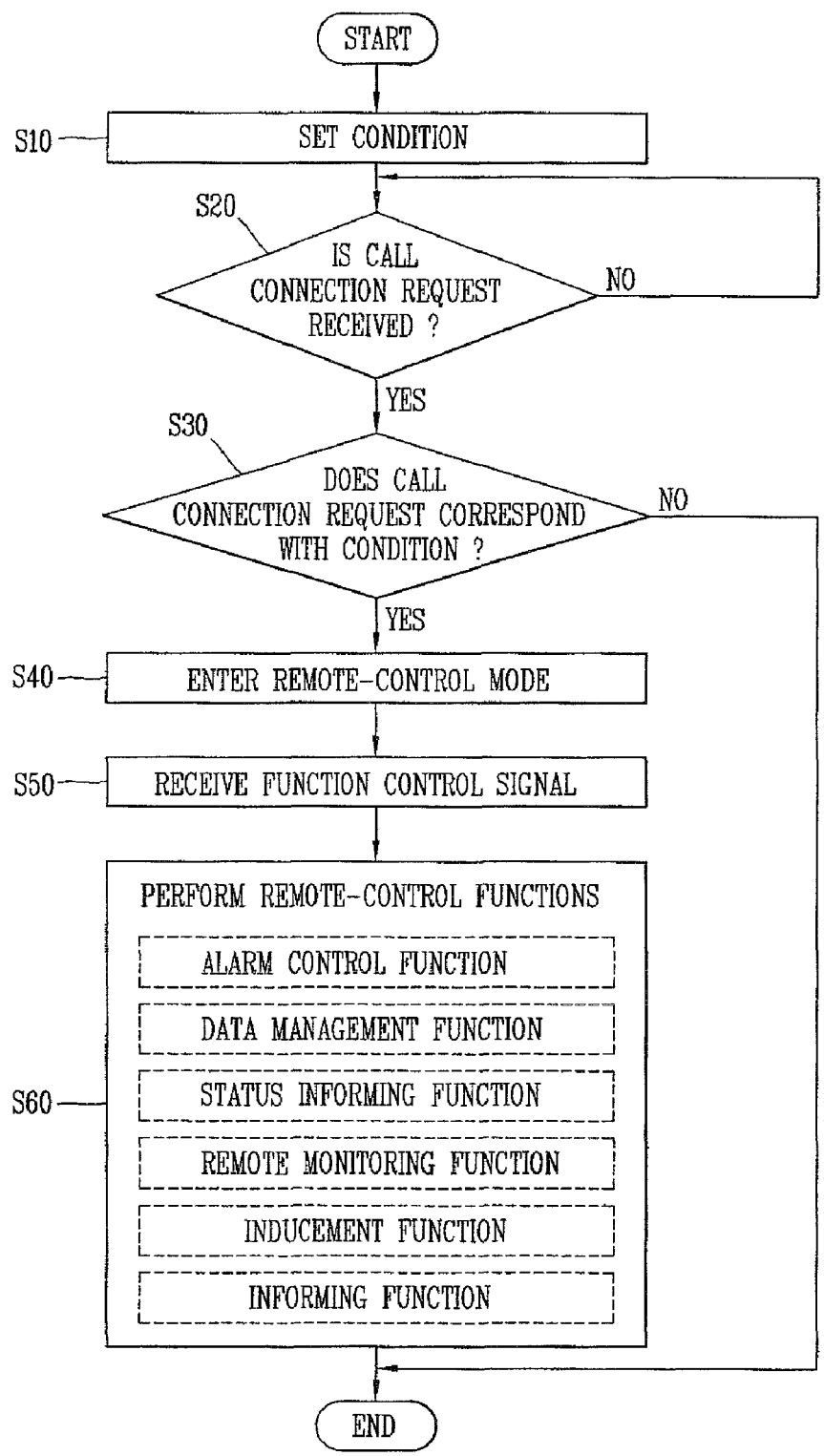
FIG. 6 is a flowchart showing a method for remote-controlling a mobile terminal according to an example embodiment of the present invention.

FIG. 6 is a flowchart showing a method for remote-controlling a mobile terminal according to an example embodiment of the present invention. Other operations, orders of operations and embodiments are also within the scope of the present invention.

A condition relating to remote-controlling may be set in the mobile terminal 100 in operation S10. The condition may be a new condition or a set condition. The set condition may be stored in the memory 160.

The set condition may be valid only when a call connection is requested. Accordingly, the controller 180 may determine whether a call connection request has been received in operation S20. The call connection request may be received through a mobile communication network, or an Internet Protocol (IP)-based wireless communication network. Through the IP-based network, the call connection request may be received in the form of Internet Multimedia Subsystem (IMS). If there is no call connection request in operation S20, the controller 180 may again check, in a standby mode, whether a call connection request has been received in operation S20.

Once a call connection request is received in operation S20, the condition determination module 182 (FIG. 1) of the controller 180 may check whether the call connection request corresponds to the set condition in operation S30. If the call connection request does not correspond to the set condition, the controller 180 may end the method for remote-controlling the mobile terminal 100. The condition will be explained with reference to FIG. 9.

If the call connection request corresponds to the set condition in operation S30, the controller 180 may allow the mobile terminal 100 to enter a remote-control mode in correspondence with the requested call connection in operation S40. The informing module 183 (FIG. 1) of the controller 180 may inform (through voice, short messages, etc.) another person having another terminal or a wired telephone call-connected to the mobile terminal 100 (hereinafter an accessor) of entering the remote-control mode.

The mobile terminal 100 operating in the remote-control mode may receive a function control signal from the accessor in operation S50. The guiding module 184 (FIG. 1) of the controller 180 may inform the accessor of selectable function control signals. The function control signal may be one of dual tone multi frequency (DTMF), packet data, a short message, and voice data.

In accordance with the function control signal, the controller 180 may perform a remote-control function for the mobile terminal 100 in operation S60. The term remote-controlling may indicate controlling the mobile terminal 100 at a remote distance through a mobile communication network as compared to through direct control by the user input unit 130 of the mobile terminal 100.

The remote-control function may include an alarm control function, a data management function, a status informing function, a remote-monitoring function, an inducement function, an informing function, etc., as will be explained below with reference to FIGS. 10 to 17. Other remote-control functions may also be provided.

Figure 7:
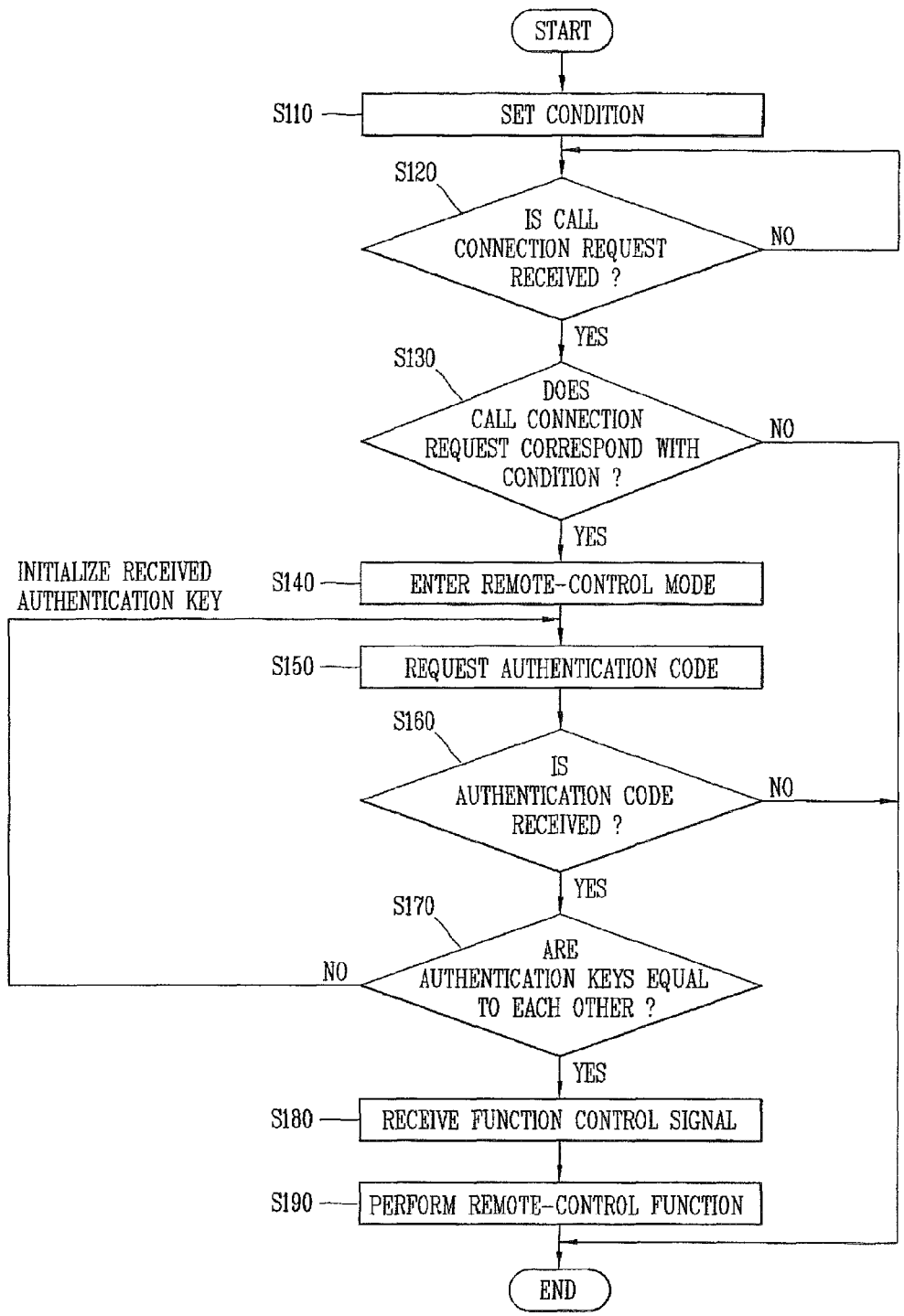
FIG. 7 is a flowchart showing a method for remote-controlling a mobile terminal including an authentication process according to an example embodiment of the present invention.

FIG. 7 is a flowchart showing a method for remote-controlling a mobile terminal including an authentication process according to an example embodiment of the present invention. Other operations, orders of operations and embodiments are also within the scope of the present invention.

FIG. 7 shows setting a condition in operation S110, determining whether a call connection request has been received in operation S120, determining whether the call connection request corresponds to the set condition in operation S130, and entering a remote-control mode in operation S140 if the call connection request corresponds to the set condition.

Once the mobile terminal 100 enters the remote-control mode, the controller 180 may request an authentication key (or code) from the accessor in operation S150. The term authentication key corresponds to an authentication code. These terms may be interchangeably used.

If no authentication key (or code) is received in operation S160, the controller 180 may determine that the accessor is not the mobile terminal's owner (or agent), and the controller 180 may end the remote-controlling mode.

If an authentication key is received in operation S160, the authentication key determination module 185 (FIG. 1) of the controller 180 may determine in operation S170 whether the received authentication key corresponds with an authentication key set in the memory 160. If the two authentication keys do not correspond with each other, the controller 180 may initialize the received authentication key to allow the accessor to re-input an authentication key. The controller 180 may send a hint about the authentication key to the accessor. If re-input authentication keys do not correspond with the set authentication key by a predetermined frequency, the controller 180 may determine that the accessor is not the mobile terminal's owner. Accordingly, the controller 180 may output a response stored in the memory 160, or may release the call connection.

If the re-input authentication key corresponds with the set authentication key, the controller 180 may sequentially perform receiving a function control signal in operation S180, and execute a remote-control function in operation S190. The authentication key will be explained with reference to FIG. 9.

The authentication in operations S150 to S170 may be performed after receiving a function control signal from the accessor in operation S180.

Figure 8:
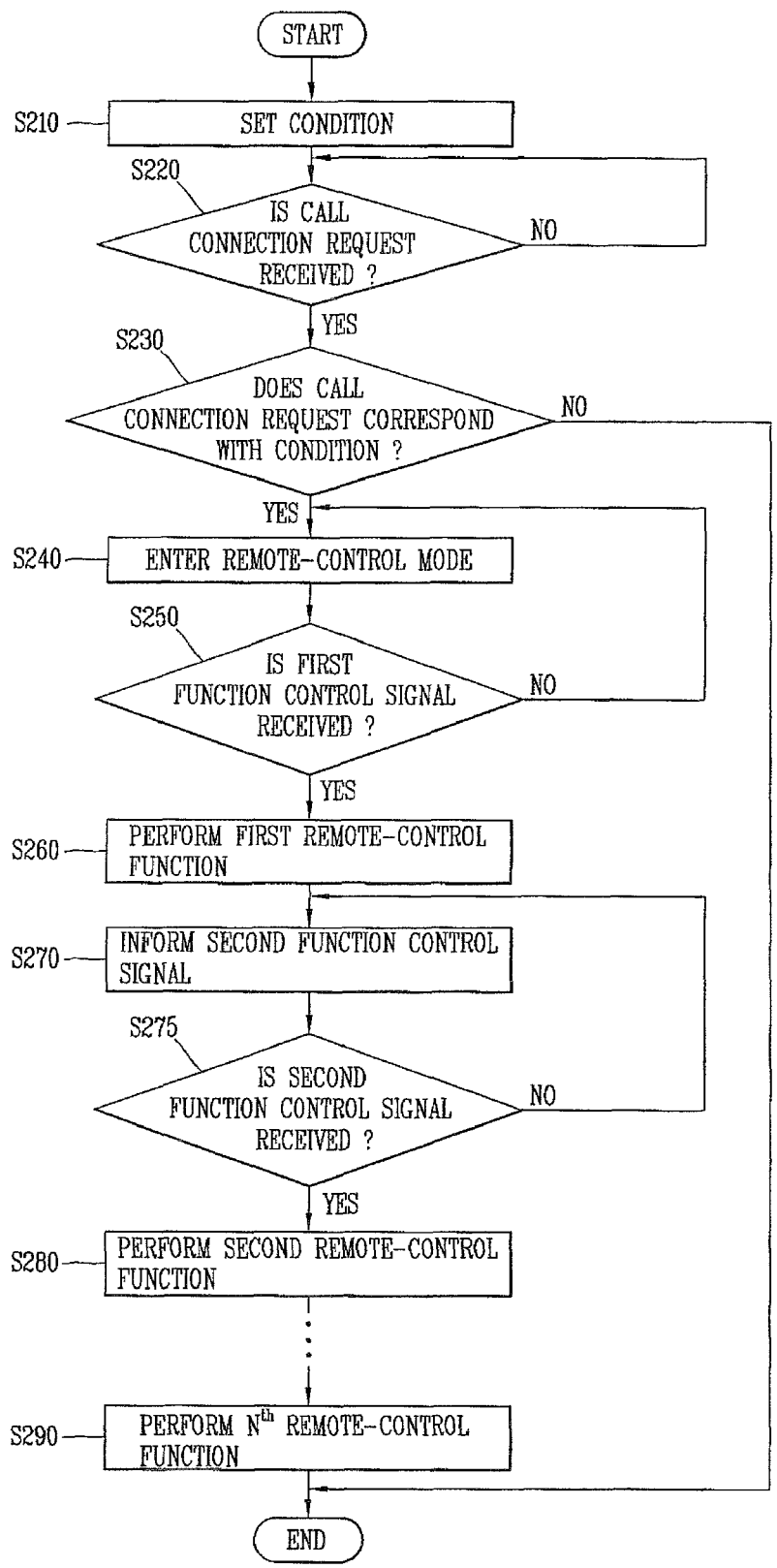
FIG. 8 is a flowchart showing a method for executing a remote-control function a plurality of times according to an example embodiment of the present invention.

FIG. 8 is a flowchart showing a method for executing a remote-control function a plurality of times according to an example embodiment of the present invention. Other operations, orders of operations and embodiments are also within the scope of the present invention.

FIG. 8 shows setting a condition in operation S210, determining whether a call connection request has been received in operation S220, determining whether the call connection request corresponds to the set condition in operation S230, and entering a remote-control mode in operation S240 when the call connection request corresponds to the set condition.

Once the mobile terminal 100 enters the remote-control mode, the controller 180 may determine whether a first function control signal has been received in operation S250. Once the first function control signal has been received in operation S250, the controller 180 may perform the first remote-control function in operation S260.

If the call connection status is maintained after performing the first remote-control function, the guiding module 184 may inform the accessor of a second function control signal in operation S270. If the second function control signal has not been received, the guiding module 184 may repeatedly inform by a set frequency in operation S275.

If the second function control signal has been received, the controller 180 may perform a second remote-control function in operation S280. The second remote-control function may be different from the first remote-control function. Accordingly, the accessor can remote-control the mobile terminal 100 more intensively as time lapses.

For example, the accessor may try to detect a position of the mobile terminal 100 by setting a bell sound of the mobile terminal 100 to a maximum, and/or may try to detect the position of the mobile terminal 100 by activating the camera 121.

If the call connection status is maintained in operations S270 and S280, the second remote-control function may be repeatedly performed in a same manner as the first remote-control function. Likewise, the $N^{th}$ remote-control function may be performed in operation S290.

Figure 9:
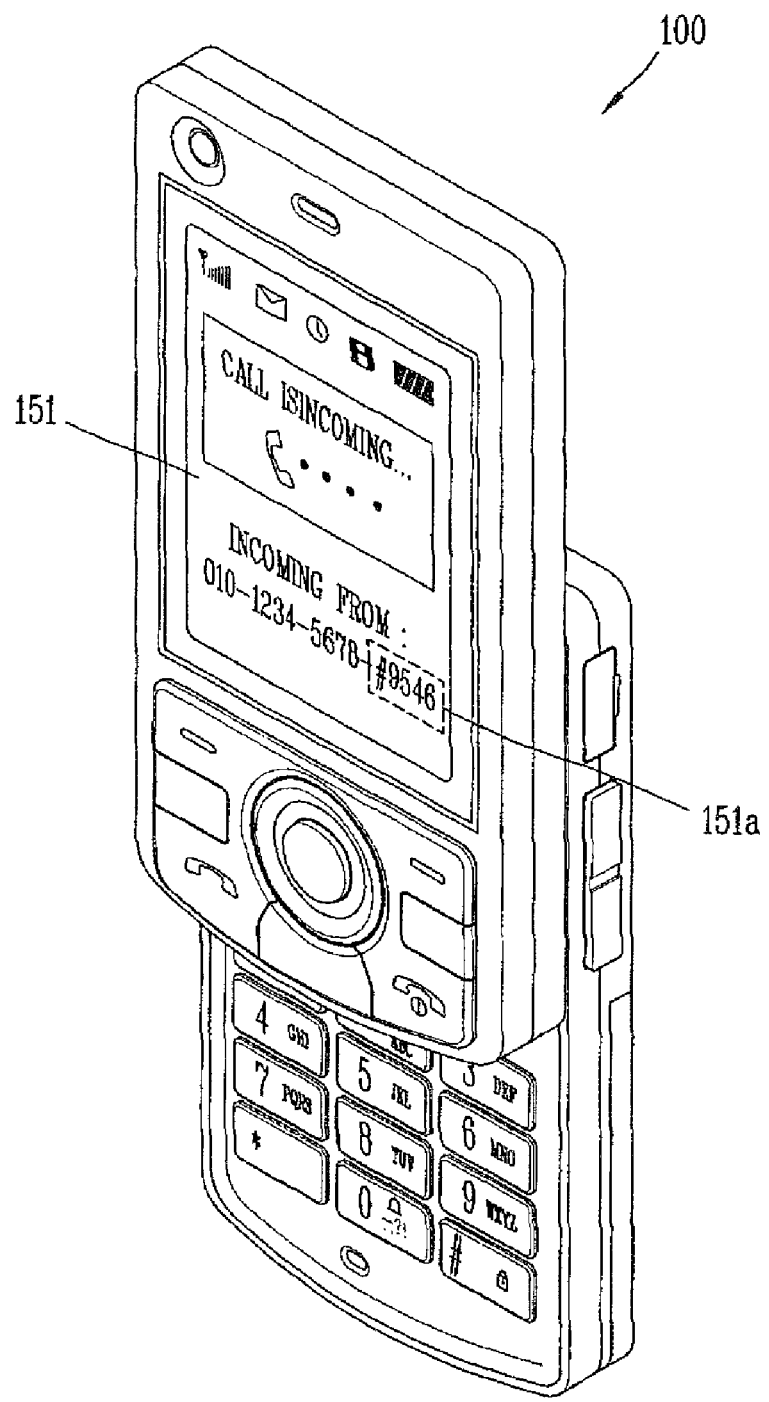
FIG. 9 is a view of a mobile terminal implemented so as to be remote-controlled according to an example embodiment of the present invention.

FIG. 9 is a view of a mobile terminal implemented so as to be remote-controlled according to an example embodiment of the present invention. Other embodiments and configurations are also within the scope of the present invention.

The accessor may send an authentication key (or code) to the mobile terminal 100 requesting a call connection. The display 151 may include a sender's number (010-1234-5678-#9546) in which '#9546' (151a) denotes an authentication key (or code) to check an access right to the mobile terminal 100.

As a call connection request is performed including sending the authentication key, the mobile terminal 100 can rapidly enter a remote-control mode. The sent authentication key may be compared with an authentication key pre-stored in the memory 160 by the condition determination module 182 in order to determine whether it corresponds with the pre-stored authentication key.

The condition determination module 182 may also determine a number of times (frequency) that a call connection is requested by the accessor, or whether time reaches the set condition. The condition determination module 182 may detect an incoming sound.

For example, if the accessor continues to request a call connection until an incoming sound rings ten times, the controller 180 may determine that the call connection request corresponds with the set condition, thereby allowing the mobile terminal 100 to enter a remote-control mode.

On the contrary, if a same sender (accessor)'s number is received a predetermined number of times (or frequency) as stored in the memory 160, the condition determination module 182 may determine that the set condition is satisfied when a call connection is requested by the set frequency. Further, when a set sender's number stored in the memory 160 is received, the condition determination module 182 may also determine that the set condition is satisfied.

When a short message including an authentication key (or code) is received, the condition determination module 182 may also determine that the set condition is satisfied. Once a short message is received from a sender and then a call connection to the sender is requested, the controller 180 may allow the mobile terminal 100 to enter the remote-control mode. However, even when the short message is received under a state that a call connection request is received from an accessor, the controller 180 may allow the mobile terminal 100 to enter the remote-control mode.

Figure 10:
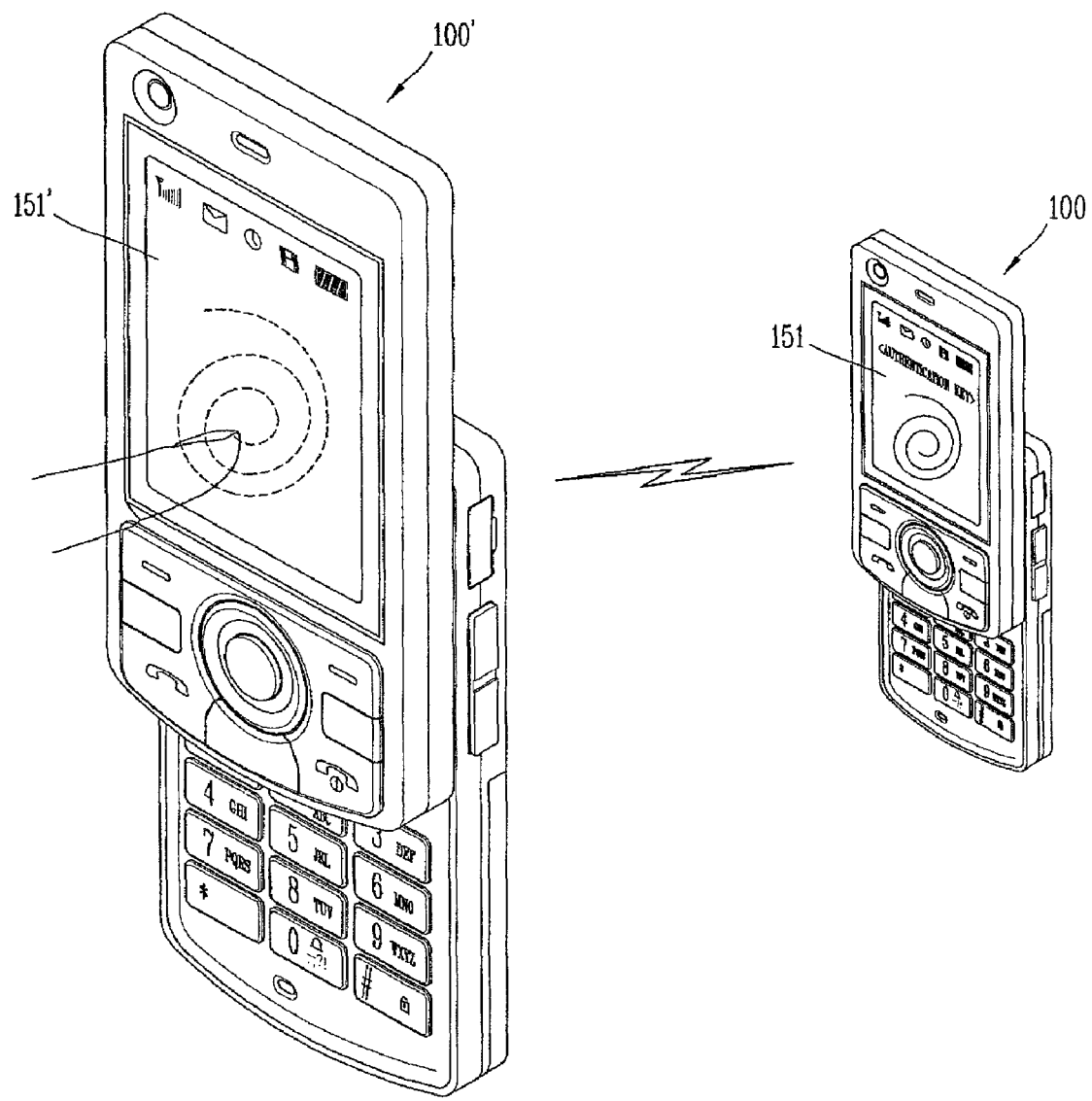
FIG. 10 is a view of a mobile terminal having an input type of an authentication key or code sent to the mobile terminal.

FIG. 10 is a view of the mobile terminal 100 having an input type of an authentication key sent to the mobile terminal. An accessor may input an authentication key (or code) on his or her mobile terminal 100' to be sent to the mobile terminal 100 (i.e., an owner's mobile terminal). The authentication key may be a pattern input through a display 151' of the mobile terminal 100'. The display 151' may be a touch screen, and the pattern may be a touch pattern. As shown, the touch pattern may be a spiral pattern, or a pattern having a discontinuous shape and configured so that a plurality of points thereof can be touched. Other patterns may also be used.

The authentication key (or code) may be one of numbers, characters, and/or symbols, or the authentication key may be a combination thereof.

The authentication key (or code) may also be a human's body information such as fingerprint, iris, face, and/or voice. The mobile terminal 100' may be mounted with at least one sensor to detect the human's body information.

The authentication key may also be an accessor's specific gesture recognized by a camera of the mobile terminal 100'.

Remote-control functions will now be explained with reference to FIGS. 11 to 18.

Figure 11:
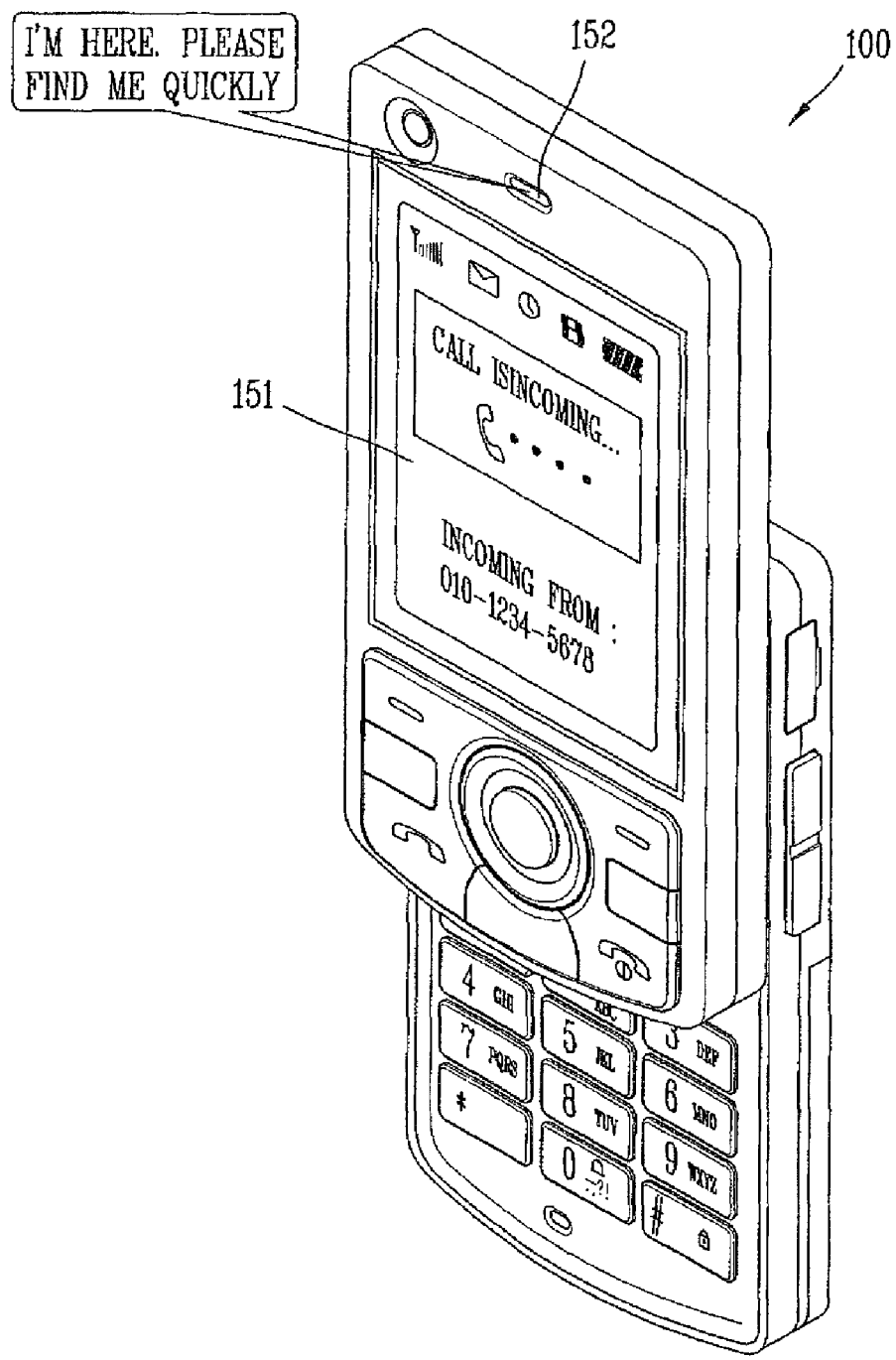
FIG. 11 is a view of a mobile terminal having an alarm control function.

FIG. 11 is a view of a mobile terminal having an alarm control function. The alarm control function may include an informing function informing that a call connection request to the mobile terminal 100 was received. For example, the alarm control function may inform an incoming status of the mobile terminal 100 by activating a bell sound, a vibration, or the flash 250 (FIG. 3), or inform an accessor of a position of the mobile terminal 100. The alarm control function may be implemented through the audio output module 152, the alarm module 153, etc. of the output unit 150.

The alarm control function may adequately change or control a set alarm function of the mobile terminal 100 stored in the memory 160. For example, in a bell sound mode (among incoming alarm modes according to a call request), a bell sound may be set to have a volume higher than a set volume, or the bell sound may be set to have a maximum volume. The volume may be increased gradually or may be increased at one time. If the mobile terminal 100 is at a quiet location, the current mode of the mobile terminal 100 may change to a mute mode to emit no sound.

Another bell sound, other than set bell sounds, may be output from the mobile terminal 100. For example, 'I'm here, please find me quickly' may also be output, and the accessor may find the mobile terminal 100.

If the incoming mode is implemented as a vibration mode, a level of vibration may be set to a maximum, or a vibration may change into a bell sound. A bell sound may be output with an activated vibration.

While a bell sound and/or a vibration are output, the flash 250 may be also activated continuously or intermittently. The flash 250 may be activated without outputting a bell sound.

Figure 12:
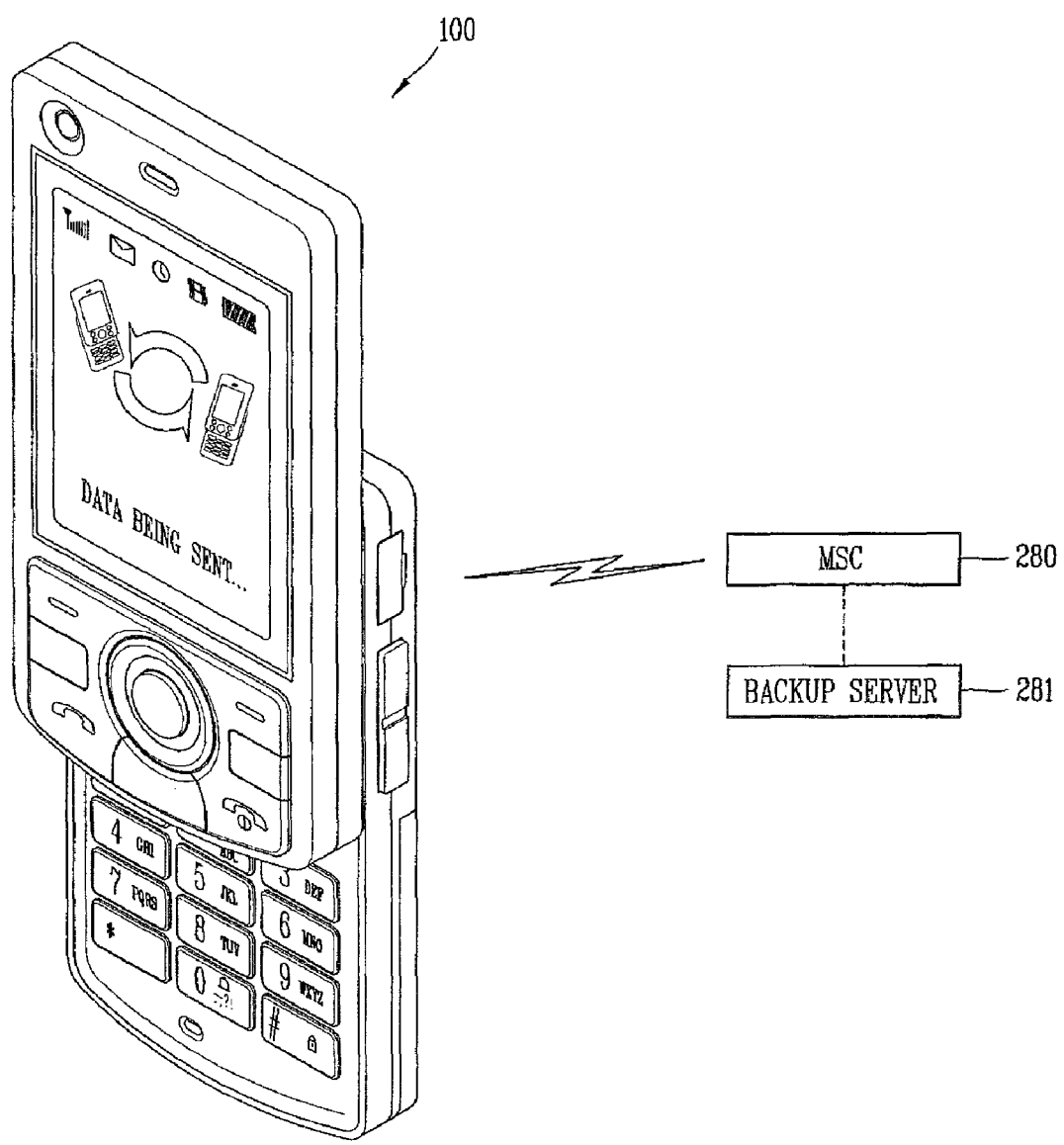
FIG. 12 is a view of a mobile terminal having a data management function.

FIG. 12 is a view of a mobile terminal having a data management function. Data stored in the mobile terminal 100 that can not be immediately accessed may be required. If the mobile terminal 100 is lost, the mobile terminal's owner may be concerned about leakage or recovery of the data.

The data management function may include remote-controlling the mobile terminal 100 with respect to stored data.

The controller 180 may send data stored in the mobile terminal 100 to a backup server 281 cooperating with a base station (or more specifically a mobile switching center (MSC) 280) of FIG. 4) by performing the data management function. The sending of data may be performed through the mobile communication module 112 or the wireless internet module 113.

During the sending of data, functions other than a data sending function may be converted into a locked status so that a person who obtains the mobile terminal 100 (hereinafter a possessor) can not operate the mobile terminal 100. The locked functions may need to be partially or entirely released. The locked status may be set or released regardless of the sending of data.

After the sending of data is completed, the mobile terminal 100 may be initialized. Even if the mobile terminal 100 is not returned to the owner, the mobile terminal's owner information may be prevented from leaking.

In order to obtain power necessary to manage data, a power supply from the power supply unit 190 may be stopped. However, once a call connection request is received from the mobile terminal's owner, the stopped power supply may restart to allow communication between the mobile terminal's owner and the possessor.

A secondary power supply unit that operates only when a call connection is requested from the mobile terminal's owner may be further provided at the mobile terminal 100. The secondary power supply unit may be provided in the mobile terminal 100 by being mounted to a circuit board so as not to be exposed. The secondary power supply unit may be periodically charged by the power supply unit 190. The secondary power supply unit may solve a problem of power shortage during data backup.

Figure 13:
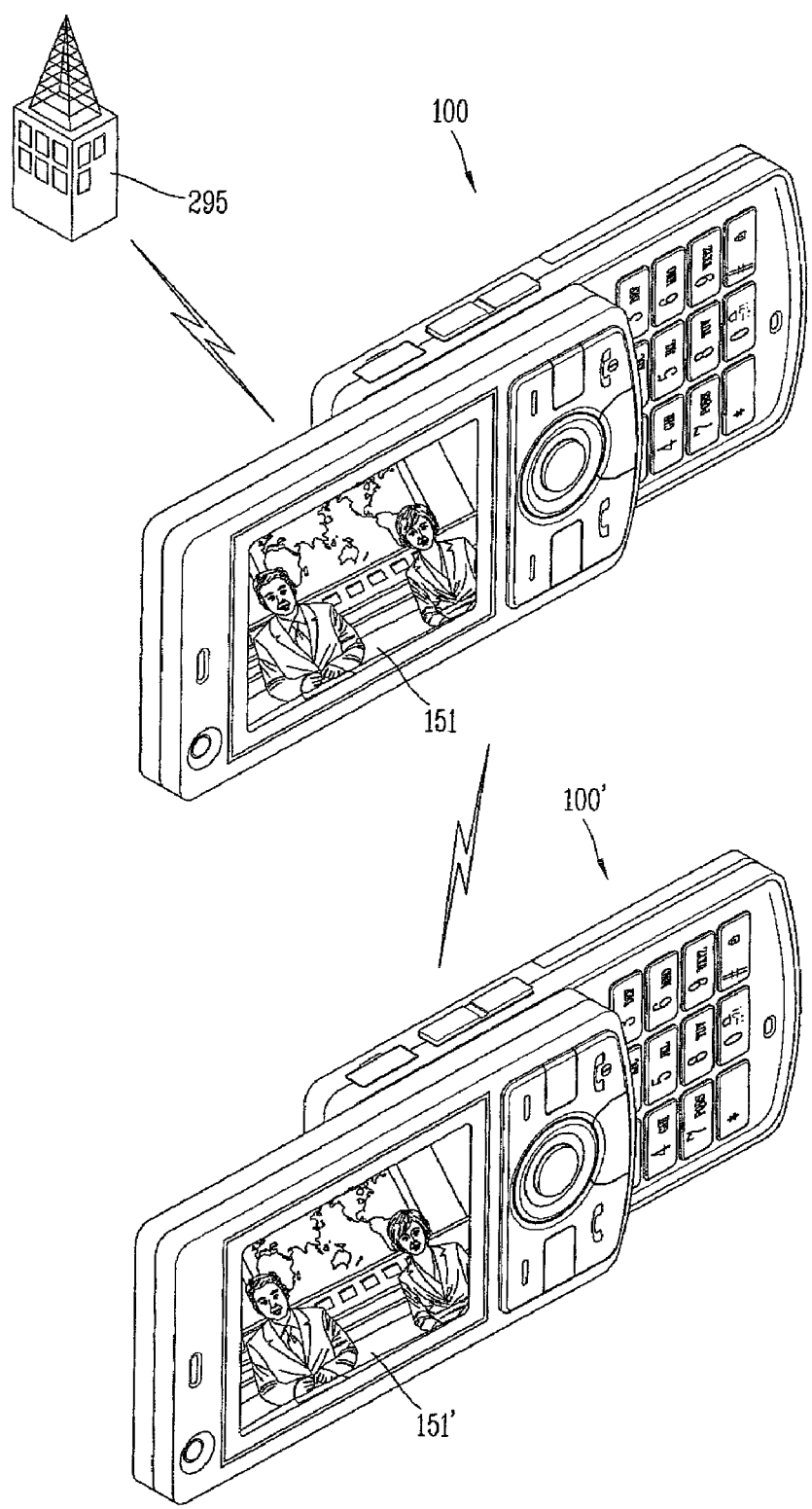
FIG. 13 is a view of a mobile terminal having another data management function.

FIG. 13 is a view of a mobile terminal having another data management function. Data stored in the memory 160 of the mobile terminal 100 or being currently received may be sent to the accessor's mobile terminal 100'. This may allow the accessor to use the information stored in the mobile terminal 100 through the mobile terminal 100' even at a remote distance.

The information stored in the mobile terminal 100 may include a telephone directory, stored or received short messages, a list about missed calls, voice mails, visual voice mails, a web surfing list, memos, schedules, content files (photo files, image files, moving image files, MP3 files, etc.), broadcasting schedules, broadcasting reservation recording information, etc.

Broadcasting information sent to the mobile terminal 100 from the broadcasting transmitter 295 may be sent to the accessor's mobile terminal 100' through the data management function. The broadcasting information may be sent in real time to the mobile terminal 100' while being received by the mobile terminal 100. Accordingly, even if the mobile terminal 100' is not provided with a broadcasting receiving module, the accessor may watch broadcasting programs through the mobile terminal 100 having the broadcasting receiving module 111.

The mobile terminal 100 may not only send data to the mobile terminal 100', but may also store data having changed as the accessor controls the mobile terminal 100'. For example, the accessor may input new names and telephone numbers to a telephone directory of the mobile terminal 100.

A user's status may change even in the case of a messenger program using a short message service of the mobile terminal 100. This may be suitable when the mobile terminal's owner does not possess the mobile terminal 100.

Figure 14:
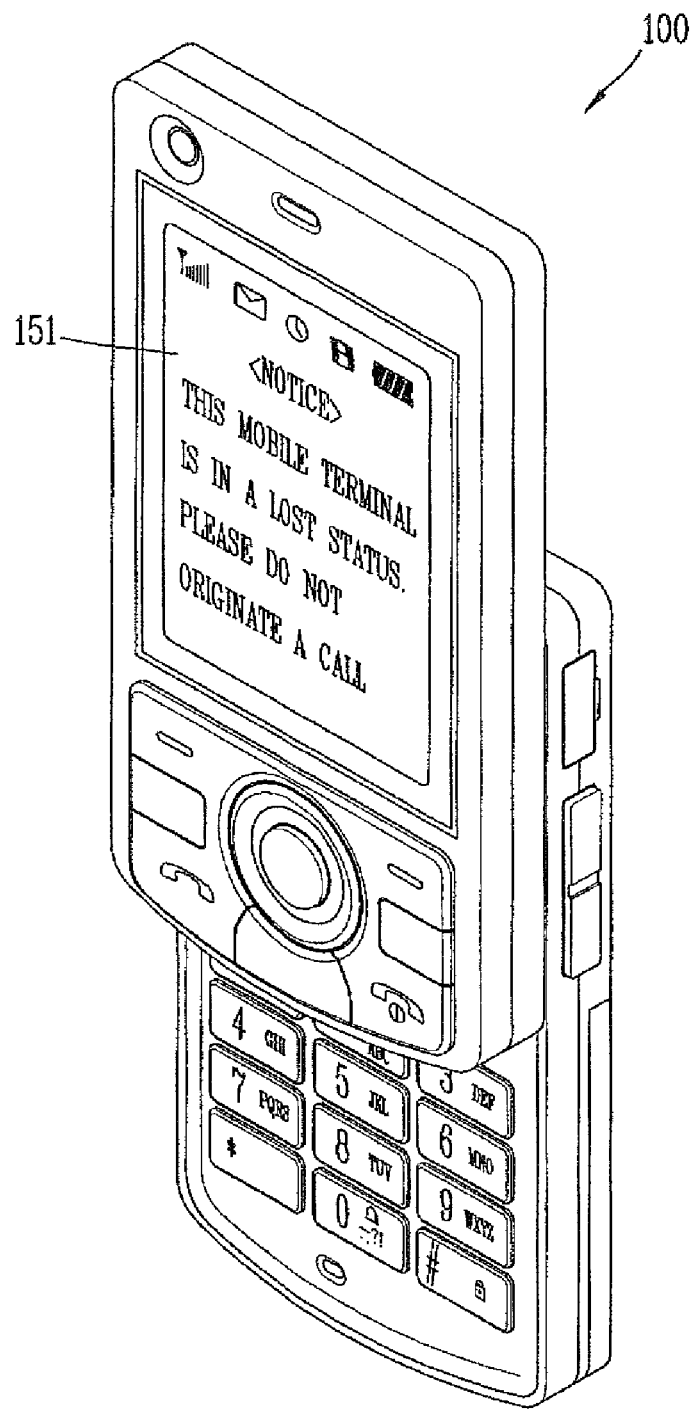
FIG. 14 is a view of a mobile terminal having a status informing function.

FIG. 14 is a view of a mobile terminal having a status informing function. The status informing function may inform a possessor that the mobile terminal 100 is in a lost status.

The status informing function may be performed through the output unit 150 of the mobile terminal 100.

The audio output module 152 may output a message on the display 151 informing that the mobile terminal 100 is in a lost status. The message may be output at a constant time interval, or when the sensing unit 140 senses that the mobile terminal 100 is manipulated.

When manipulation of the mobile terminal 100 is detected, the message may be output with a high intensity since the mobile terminal 100 is currently in a possessor's hand. Accordingly, the message may include the mobile terminal owner's address or phone numbers.

Text messages or images indicating that the mobile terminal 100 is in a lost status may be output on the display 151. The text messages or images may be output to the display 151 in the form of a background screen in a standby mode. If the text messages or images are not still images but rather are moving images, the possessor may notice the lost status of the mobile terminal 100 more easily.

Not only the lost status of the mobile terminal 100, but also a phone number may be output on the display 151. If the display 151 is a touch screen, the possessor may call the owner by pressing the displayed phone number.

The text messages or images may be sent from the accessor through a short message service, etc., or may be pre-stored in the memory 160. If the text messages or images are sent from the accessor, an authentication key (or code) may be provided therein. However, if the accessor enters the remote-control mode by inputting an authentication key (or code) after a message indicating that the mobile terminal 100 is in a lost status, an additional authentication key or code may not be required.

Figure 15:
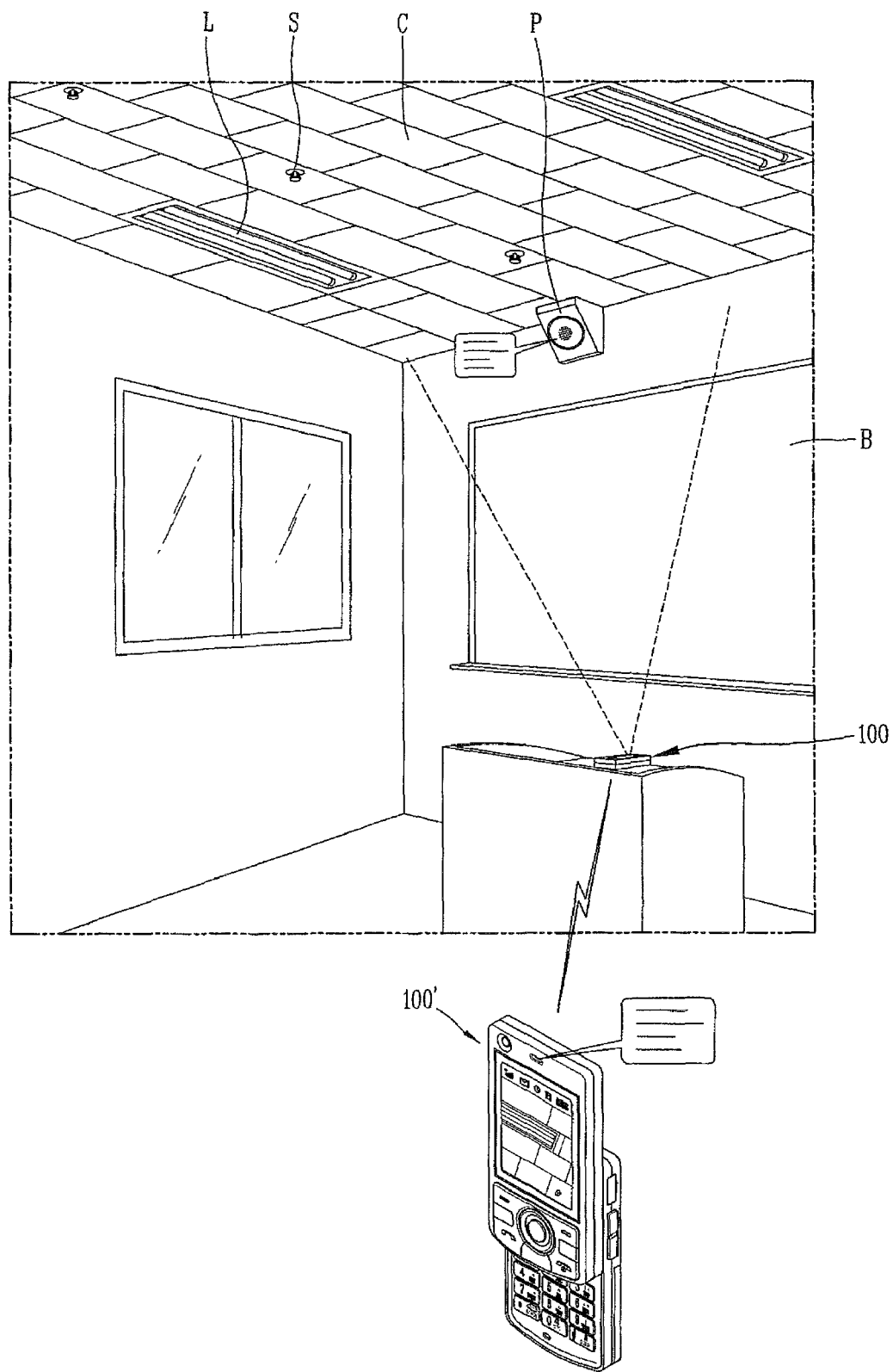
FIG. 15 is a view of a mobile terminal having a remote monitoring function.

FIG. 15 is a view of a mobile terminal having a remote monitoring function. The remote monitoring function may send a peripheral situation of a position of the mobile terminal 100 to the accessor. This may inform the accessor (or the owner) of the position or location of the mobile terminal 100.

The remote monitoring function may be performed by the camera 121 and/or the microphone 122 of the A/V input unit 120. As shown in FIG. 15, once being activated, the camera 121 may capture an image of an object (ceiling C) positioned in a capturing direction. An image showing a sprinkler S, a fluorescent lamp L, etc. installed on the ceiling C may be captured. The microphone 122 may record audio content output through a speaker P on the ceiling C. An image showing a blackboard B on the wall may also be captured.

Video information about the ceiling C and/or audio information through the speaker P may be sent to the accessor's mobile terminal 100' through the mobile communication module 112. The accessor may infer that the position of the mobile terminal 100 is a classroom in a school, etc. based on the video and audio information through the mobile terminal 100'. The accessor may also infer a current situation of the classroom based on the above information.

While collecting video and/or audio information, the mobile terminal 100 may be controlled to vibrate. If the mobile terminal 100 is moved by the vibration, additional video information may be obtained. If the mobile terminal 100 is controlled so that its camera 121 can rotate, additional video information may also be obtained. Once the camera 121 is activated, the flash 250 may be also activated for a relatively brighter atmosphere based on a time set on the mobile terminal, etc.

Coordinates of the position of the mobile terminal 100 may also be checked or determined using the position-information module 115.

Figure 16:
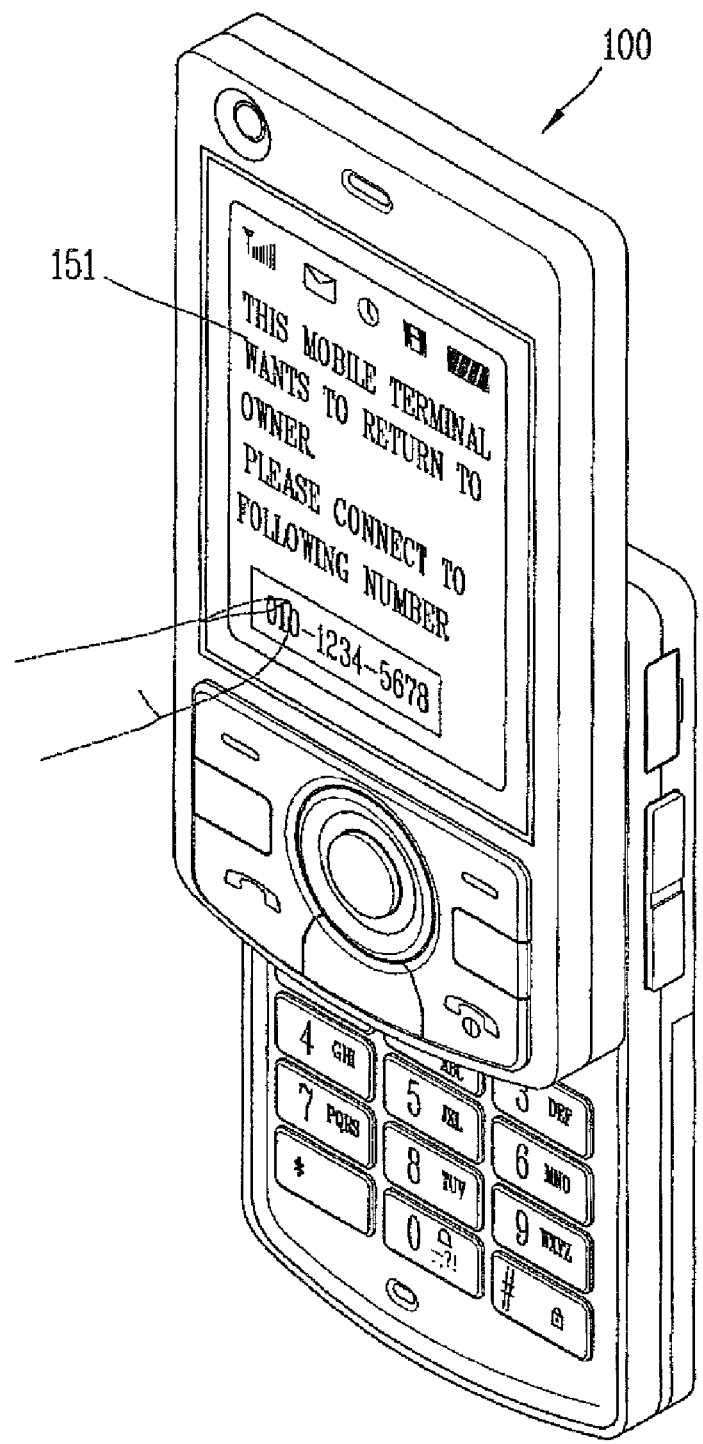
FIGS. 16 and 17 are views of a mobile terminal having an inducement function.
Figure 17:
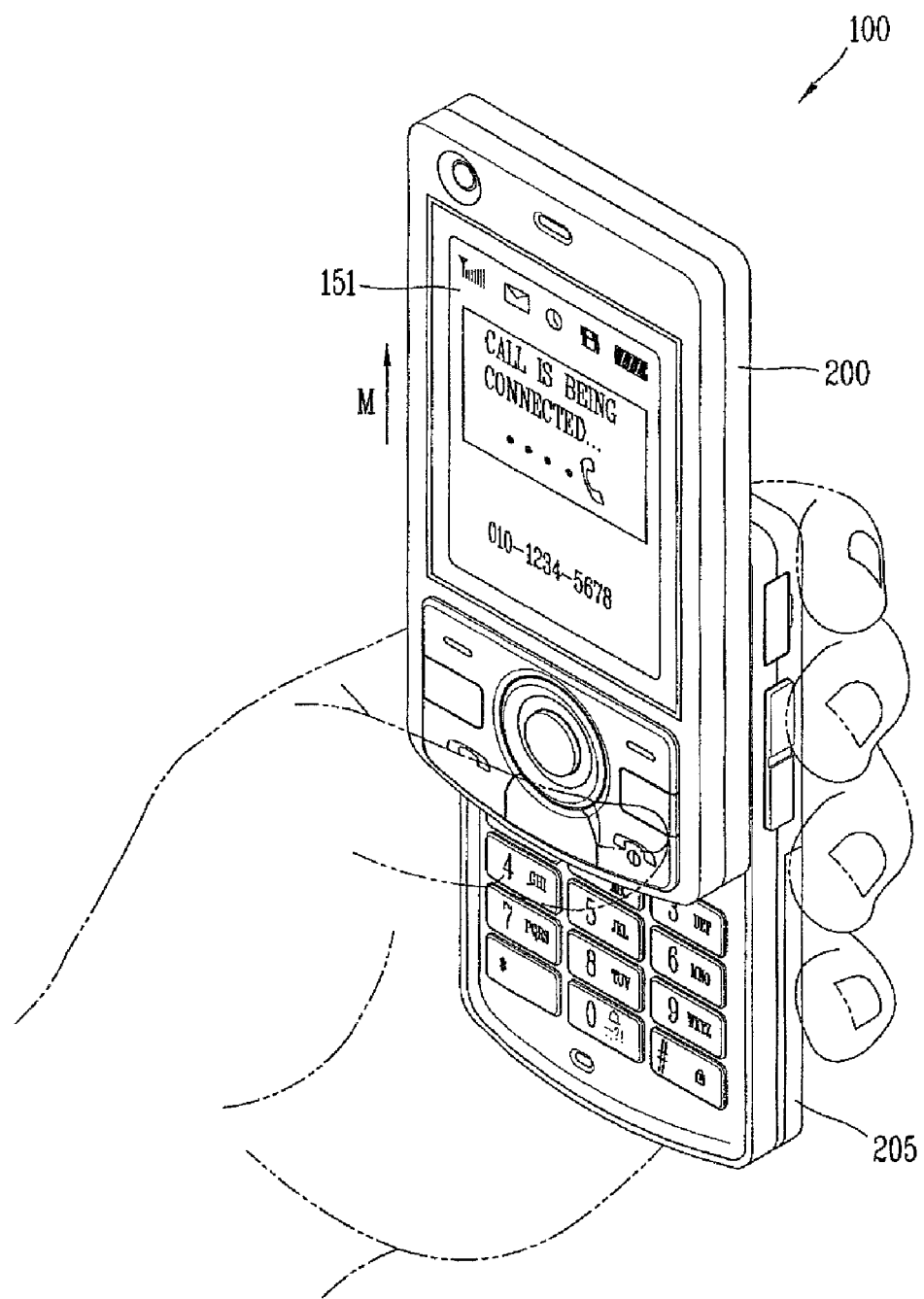

FIGS. 16 and 17 are views of a mobile terminal having an inducement function. The inducement function may induce a possessor of the mobile terminal 100 to return the mobile terminal 100 to the owner. The inducement function may be performed by the output unit 150 in a same manner as the informing function.

As shown in FIG. 16, a message indicating that the mobile terminal's owner is searching for the lost mobile terminal may be output on the display 151. The owner's location, or the owner's phone number may be output to the display 151 to induce an immediate call from the possessor. If the owner's phone number is output on a touch screen in the form of an icon, the possessor may touch the icon to cause an immediate call with the owner.

The message may also be output through the audio output module 152. The message may include information relating to return of the mobile terminal 100.

The message may be pre-stored in the memory 160, or may be received from the mobile terminal's owner through a short message service, etc. in a similar manner as the status informing function.

As shown in FIG. 17, the possessor may manipulate the mobile terminal 100 by sliding the mobile terminal into an open position along a sliding direction M. This manipulation may be detected by the sensing unit 140, and the controller 180 may control the mobile communication module 112 to perform a function corresponding to the manipulation, or to connect a call with the owner's phone number.

The call connection function may be executed not only when sliding the mobile terminal 100 into an open position, but also when calling a phone number rather than the owner's phone number by using the user input unit 130 (FIG. 1), when accessing to the Internet, etc. That is, the call connection function may be executed even when control irrelevant to return of the mobile terminal 100 is performed.

When manipulation irrelevant to return of the mobile terminal 100 is performed, a function may be set corresponding to the manipulation not to be executed for the benefit of the owner. The call connection function may not be necessary when controlling the mobile terminal 100 so as to receive a call from the accessor.

A locking function of the mobile terminal 100 may prevent the mobile terminal 100 from being mis-used, whereas the call connection function may enhance a return possibility of the mobile terminal 100 to the owner while performing the locking function.

Figure 18:
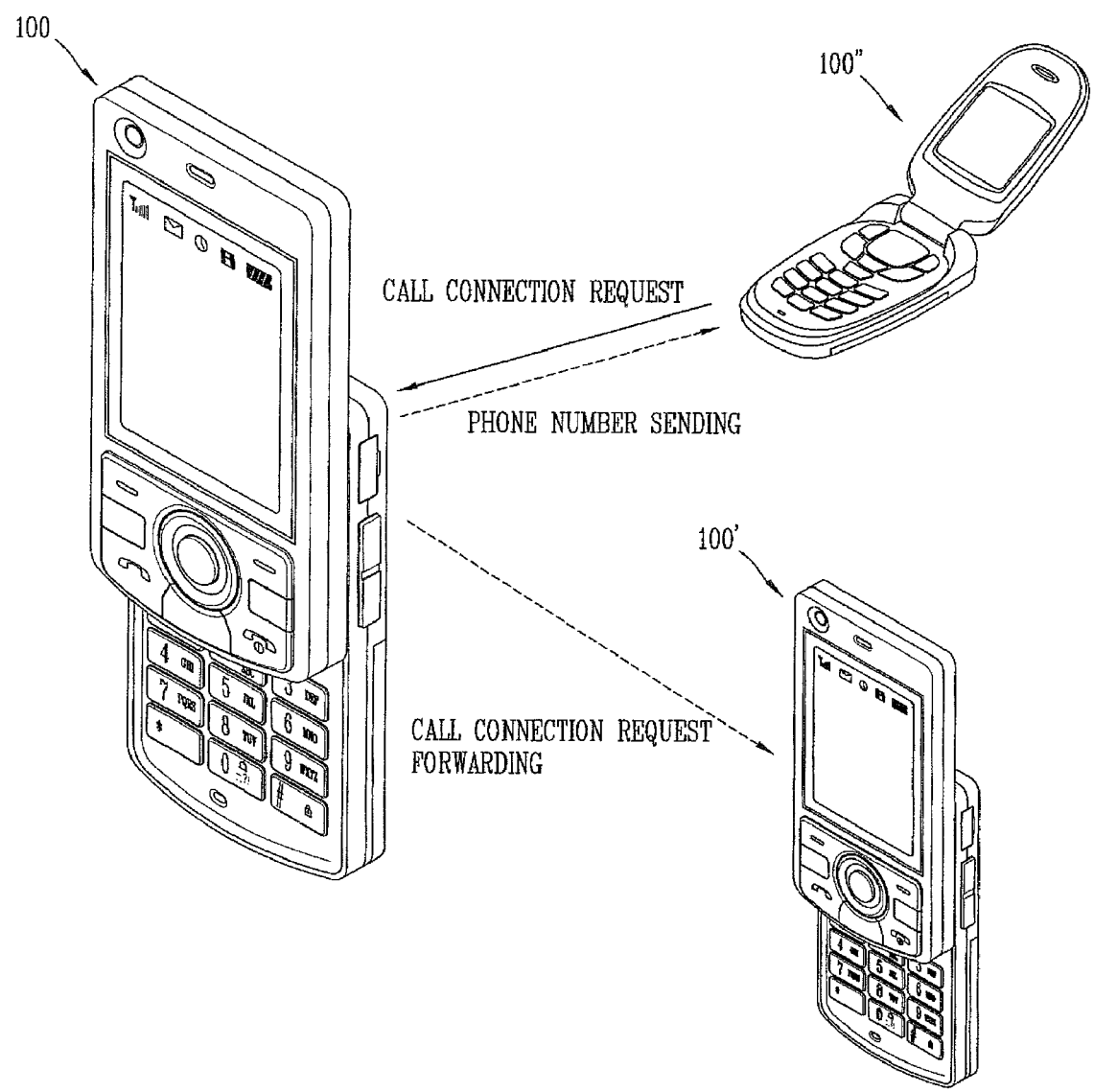
FIG. 18 is a view of a mobile terminal having an informing function.

FIG. 18 is a view of the mobile terminal having an informing function. The informing function may correspond to a call connection request from a third party rather than from the mobile terminal's owner or a possessor. The third party may be one who tries to connect a call with the owner through a mobile terminal 100". The informing function may be performed in a state that the owner does not possess the mobile terminal 100.

In correspondence with the call connection request from the third party, the controller 180 of the mobile terminal 100 may send the owner's phone number to the third party's mobile terminal 100" through a short message service.

When the mobile terminal 100 is not possessed by the owner, the controller 180 may perform a call forwarding to the mobile terminal 100' temporarily possessed by the owner.

Figure 19:
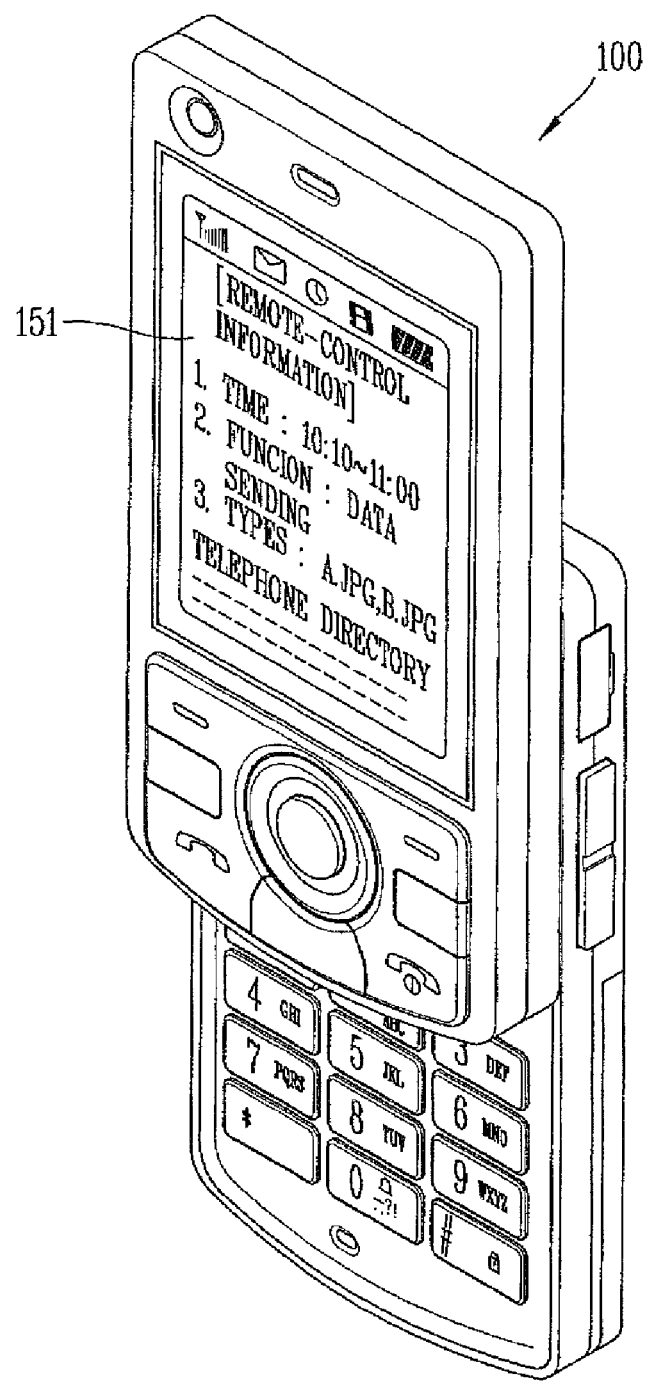
FIG. 19 is a view of a mobile terminal having an information output function.

FIG. 19 is a view of a mobile terminal having an information output function. As shown in FIG. 19, once the mobile terminal 100 is recovered, the owner may want to know information relating to remote-control functions performed by the mobile terminal 100. Accordingly, a call history (detailed recording) relating to the remote-controlling may be stored in the memory 160.

Once the owner manipulates the user input unit 130, etc. of the mobile terminal 100, the mobile terminal 100 may request the owner to input a password (command). If the input password matches a set password, the mobile terminal 100 may output the call history.

The call history may be output in an audio or video manner through the output unit 150.

The call history may include time when a remote-control function was performed, and the kind of the remote-control function. Detailed status change of the mobile terminal 100 (e.g., sending of specific data, change, etc.) according to the remote-control function may be also included in the call history.

When data has been sent, the kind of data (e.g., names of photo files, image files, moving files, etc.) may also be output. At the time of change occurrence, the kind of change, such as names added to a telephone book (directory), may be output.

If too large an amount of information is to be displayed on the display 151, a scroll bar may be displayed. If the display 151 is a touch screen, a user can check the information at a glance by dragging the scroll bar in a touch manner.

The information relating to status change may be output in order based on time, or may be output in the form of a group according to kind or similar content. In the former case, a scroll may be effectively used. However, in the latter case, icons representing each group may be selected to allow detailed information of the selected groups to be output. If the display 151 is a touch screen, the process for selecting and executing the icons may be easier.

In the mobile terminal and the method for remote-controlling thereof, a condition for remote-controlling the mobile terminal 100 can be set according to the owner's demand or circumstances.

Since a remote-control function is performed by receiving a function control signal, a suitable remote-control function may be selected according to a call connection requester's demands. This may allow demands of a person requesting the call connection so as to remote-control the mobile terminal to be more satisfied.

Figure 20:
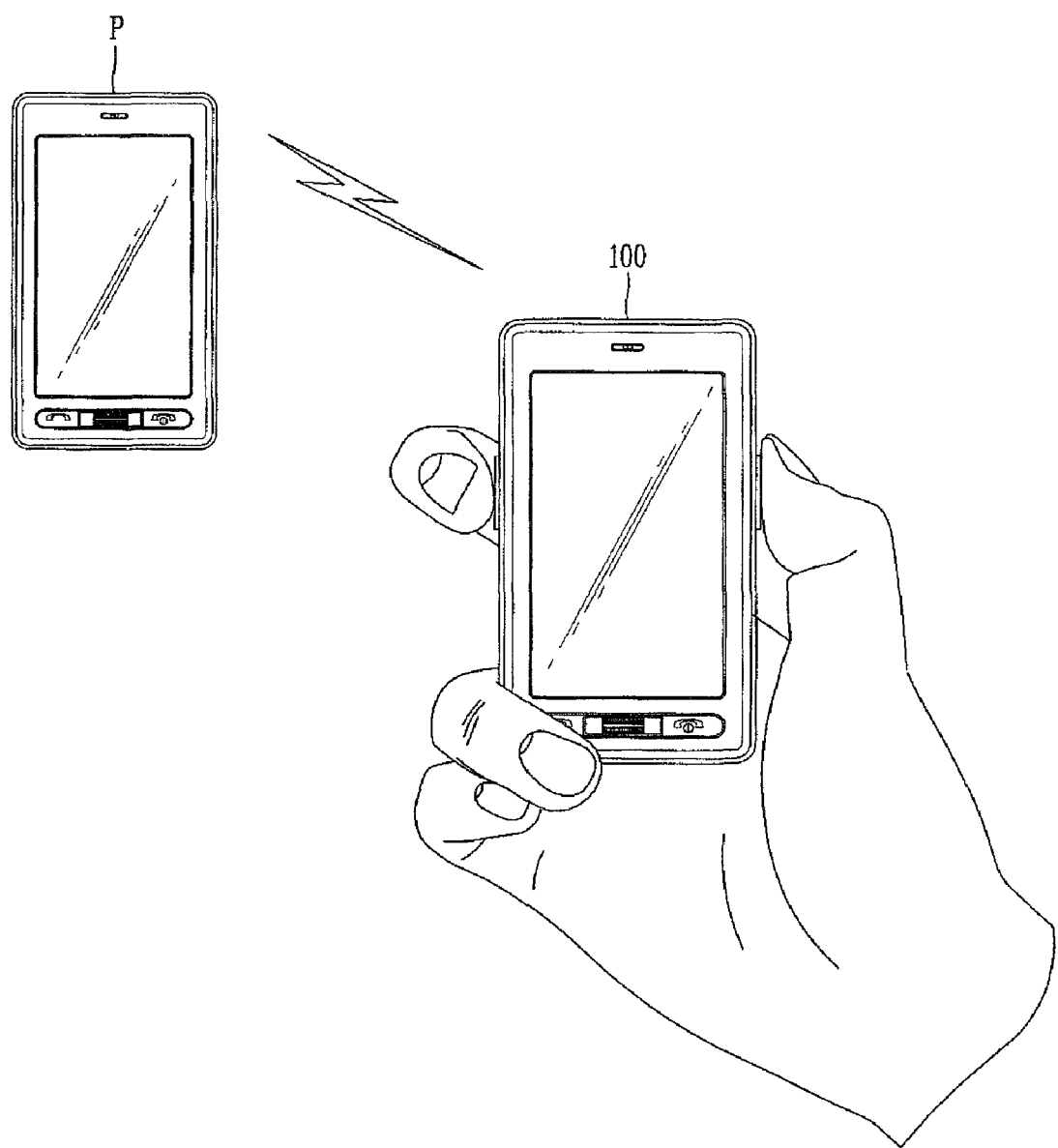
FIG. 20 is a view to explain remote-controlling a mobile terminal.

FIG. 20 is a view to explain remote-controlling a mobile terminal. As shown in FIG. 20, a mobile terminal P may be located at a place out of range to be directly manipulated by a user, due to the user's missing or etc. In this case, a mobile terminal and a method for controlling the mobile terminal P may be provided by using the mobile terminal 100.

The wireless communication unit 110 may send an authentication signal and a function control signal to the mobile terminal P. The wireless communication unit 110 may receive menu information having an allowable remote-control function among a plurality of control functions, with a connected state to the mobile terminal P. The wireless communication unit 110 may send or receive the signals through IP-based wireless communication.

The authentication signal may indicate a signal having an authentication key (or code) to access the mobile terminal P. The authentication signal may be sent through the mobile communication module 112 of the wireless communication unit 110.

The authentication signal may be sent through the short-range communication module 114. The authentication signal may be sent in Bluetooth, or Infrared Data Association (IrDA), or other short-range communication manner.

The controller 180 may include control menus by processing received menu information, and generate a function control signal corresponding to a control menu selected from the control menus. The controller 180 may send the generated function control signal through the wireless communication unit 110. When the authentication signal can not be sent through the short-range communication module 114, the authentication signal may be sent through the mobile communication module 112.

The controller 180 may determine which control menu has been selected (from among the control menus) based on a signal input through the user input unit 130.

The controller 180 may generate an authentication key (or code) necessary to obtain an access right to access information received from the mobile terminal P.

The output unit 150 may display the control menus constituted by the controller, or may output information received from the mobile terminal P.

The output unit 150 may include the display 151 for displaying information received from the mobile terminal P, and the audio output module 152 for outputting information received from the mobile terminal P.

When the short-range communication module 114 is to send an authentication signal to the mobile terminal P by using short-range communication, the display 151 may display mobile terminals that can perform short-range communication with the mobile terminal 100.

The display 151 may display the control menus in the form of a list, thumbnails, or a graphic user interface (GUI).

The memory 160 may store information received from the mobile terminal P. The memory 160 may be provided with an additional memory region for storing information received from the mobile terminal P. The memory region may be implemented as an additional folder that prevents information received from the mobile terminal P from being regarded as information pre-stored in the mobile terminal 100. In order to access the additional memory region, an additional authentication key (or code) may be set. The additional authentication key may minimize information relating to the mobile terminal P stored in the memory 160 of the mobile terminal 100 from leaking to a third party rather than the user of the mobile terminal P.

Figure 21:
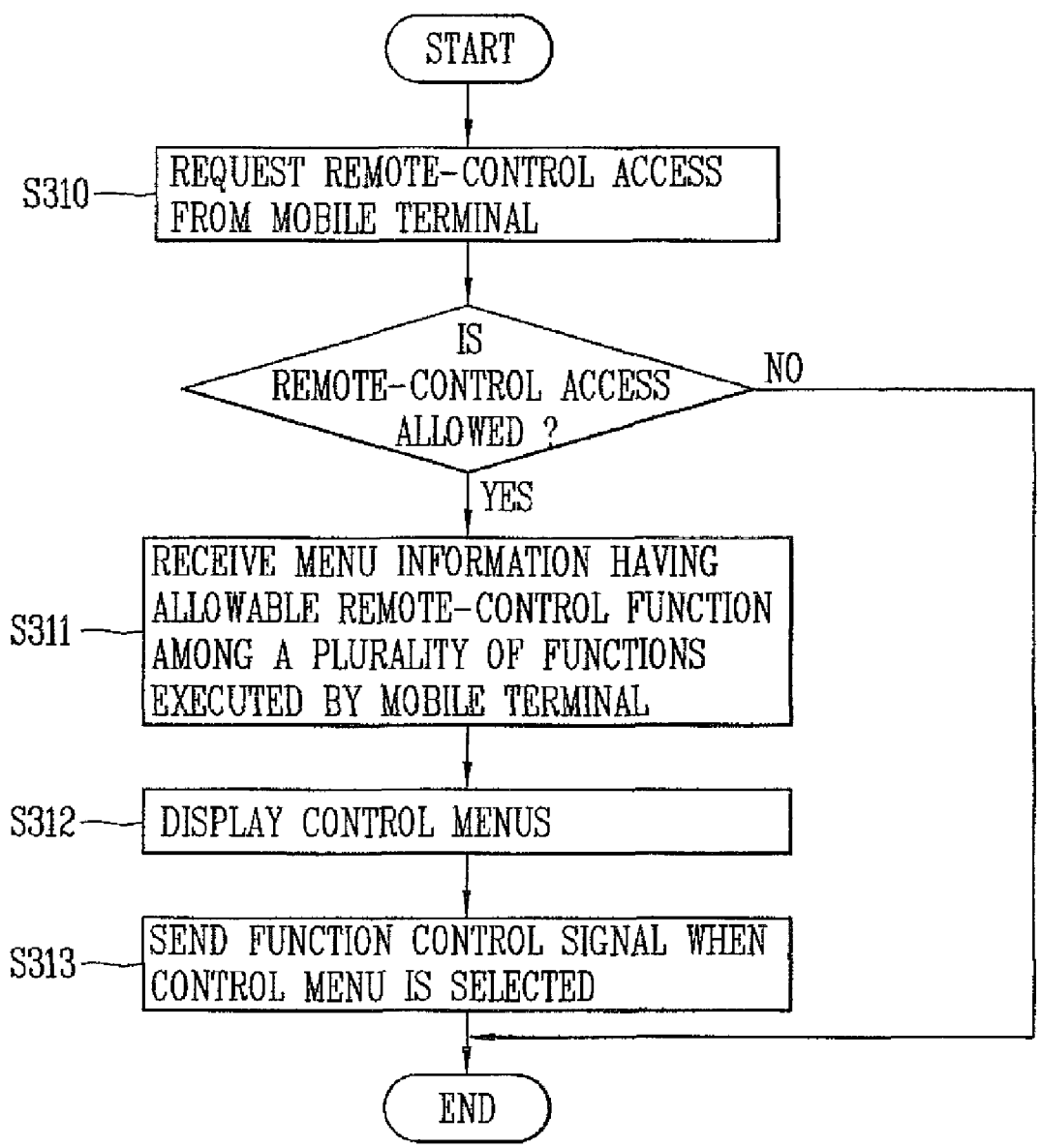
FIG. 21 is a flowchart for remote-controlling a mobile terminal according to an embodiment of the present invention.

FIG. 21 is a flowchart showing a method for remote-controlling a mobile terminal according to an example embodiment of the present invention. Other operations, orders of operations and embodiments are also within the scope of the present invention. As shown in FIG. 21, a user who can not directly manipulate his or her mobile terminal P may enter a remote-controlling mode by using the wireless communication unit 110 of the mobile terminal 100 in operation S310. The request for entering the remote-controlling mode may be performed by using an IP Multimedia Subsystem (IMS).

When a remote-control access of the mobile terminal 100 is allowed by the mobile terminal P, the mobile terminal 100 may receive, through the wireless communication unit 110, menu information having an allowable remote-control function among a plurality of control functions performed by the mobile terminal P in operation S311.

The mobile terminal 100 having received the menu information from the mobile terminal P may display, on the display 151, control menus relating to the received menu information. The menu information may be visually output on the display 151 in operation S312.

Once one or more control menus may be selected from the displayed control menus, the controller 180 may generate a control signal relating to the selected control menu, and send the control signal to the mobile terminal P through the wireless communication unit 110 in operation S313.

Figure 22:
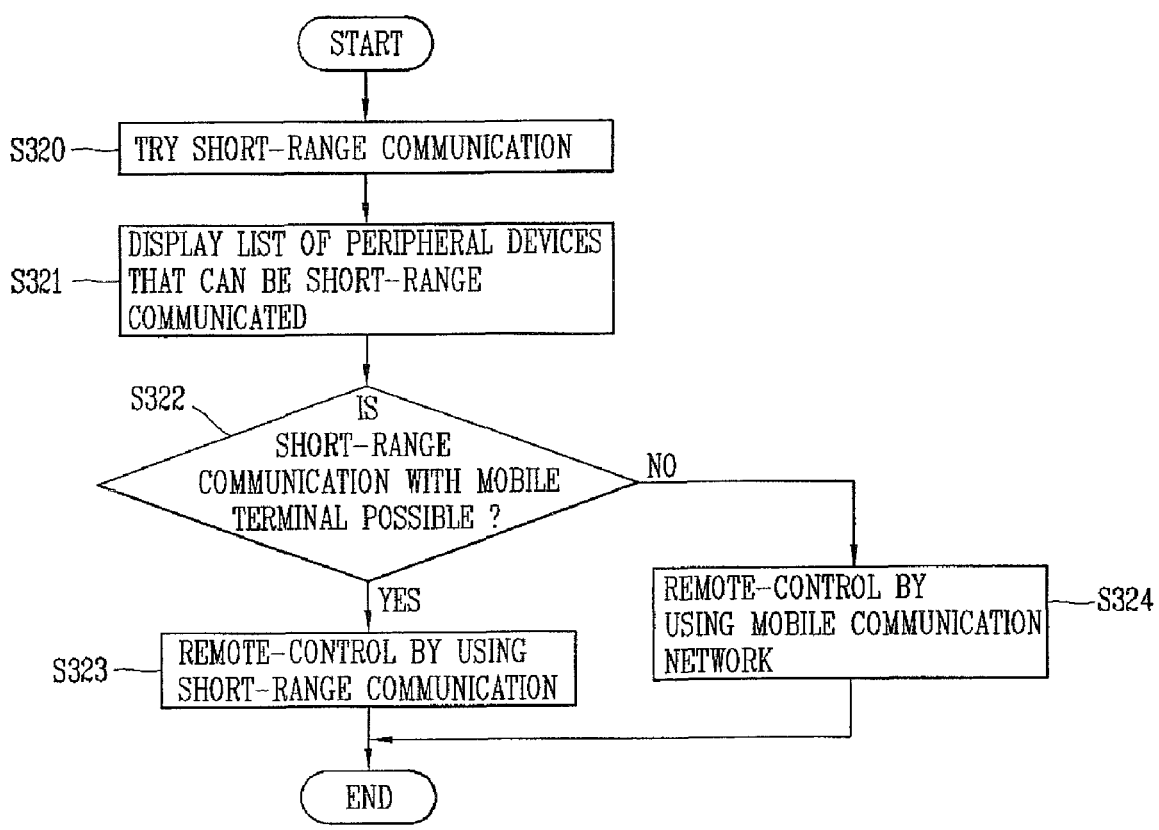
FIG. 22 is a flowchart for requesting a remote-control access to a mobile terminal according to an embodiment of the present invention.

FIG. 22 is a flowchart for requesting a remote-control access to a mobile terminal according to an example embodiment of the present invention. Other operations, orders of operations and embodiments are also within the scope of the present invention.

More specifically, FIG. 22 shows that in operation S320, a short range communication may be initially tried. Then in operation S321, a list of (peripheral) devices that can short range communicate may be displayed. In operation S322, a determination may be made whether the short range communication is possible with the mobile terminal. If the determination is affirmative, then in operation S323, the peripheral devices may be remote controlled by using the short range communication. On the other hand, if the determination is negative, then in operation S324, the peripheral devices may be remote controlled using the mobile communication network.

Figure 23:
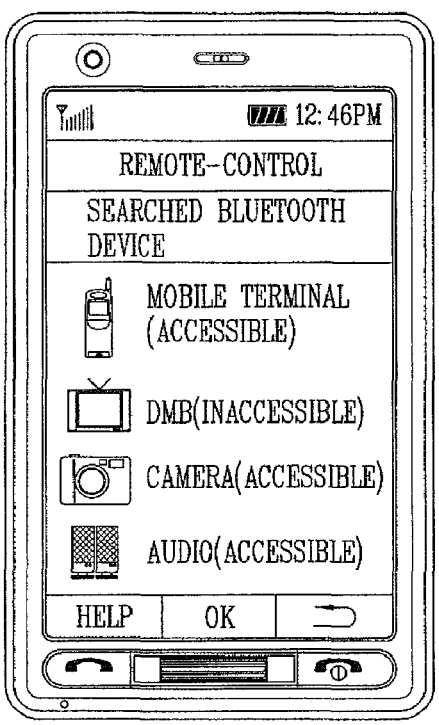
FIG. 23 is a view showing a list on a mobile terminal that displays devices that can be short-range communicated.

FIG. 23 is a view showing a list on a mobile terminal that displays devices that can be short-range communicated.

The mobile terminal 100 may try to perform communication with the mobile terminal P in various manners, so as to be allowed to remote-control access the mobile terminal P. The mobile terminal 100 may try short-range communication with the mobile terminal P through the short-range communication module 114. Suitable technologies for implementing the short-range communication module may include radio frequency identification (RFID), infrared data association (IrDA), ultra-wideband (UWB), as well at networking technologies commonly referred to as Bluetooth and ZigBee. The short-range communication may not charge fees from users. Accordingly, when the short-range communication is used, fee charging may be minimized in sending authentication signals and performing a remote-control function.

When the mobile terminal 100 tries short-range communication so as to be allowed to remote-control access the mobile terminal P in operation S320 (of FIG. 22), the short-range communication module 114 may search peripheral devices that can be short-range communicated with the mobile terminal 100. The output unit 150 of the mobile terminal 100 may output a list of peripheral devices searched by the short-range communication module 114 to be short-range communicated with the mobile terminal 100 in operation S321. As shown in FIG. 23, a list of peripheral devices that can be short-range communicated may be displayed on the display 151. The list may also be output in the form of voice through the audio output module 152.

Once the short-range communication module 114 searches peripheral devices that can be short-range communicated with the mobile terminal 100, the controller 180 may determine whether the mobile terminal P can perform short-range communication with the mobile terminal 100 in operation S322.

When the mobile terminal P can perform short-range communication with the mobile terminal 100, the short-range communication module 114 may send an authentication signal to the mobile terminal P by using short-range communication in operation S323. The authentication signal may include an authentication key (or code) for the mobile terminal 100 to access the mobile terminal P.

Figure 24:
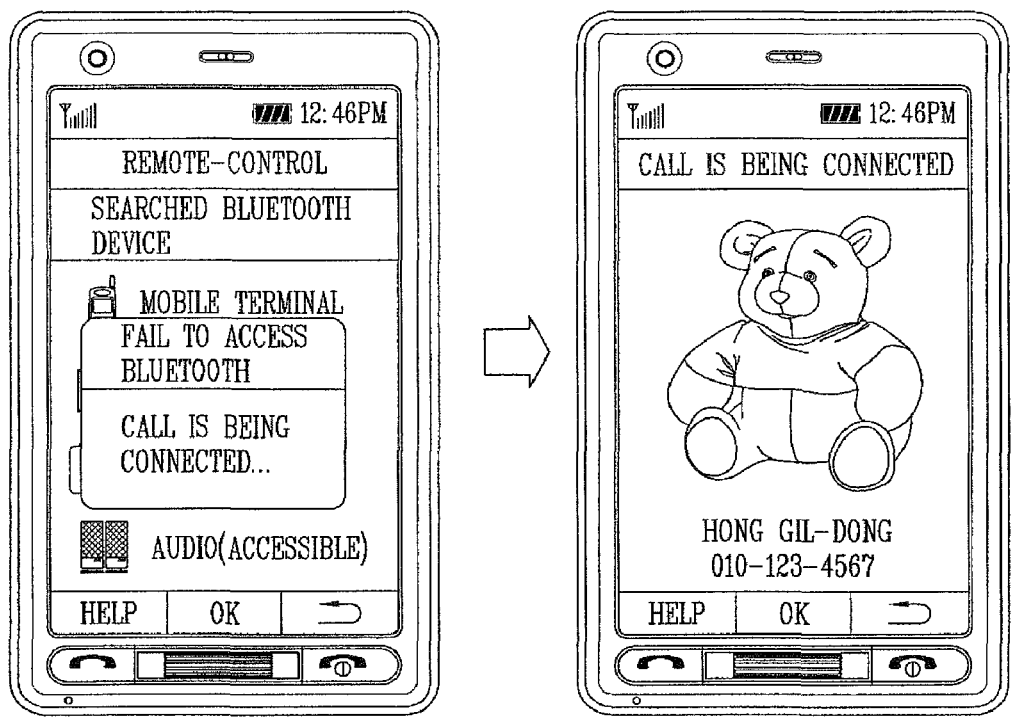
FIG. 24 is a view showing an example to send an authentication signal using a mobile communication module when short-range communication is not possible between a peripheral device and a mobile terminal.

FIG. 24 is a view showing an example to send an authentication signal using a mobile communication module when short-range communication is not possible between a peripheral device and a mobile terminal.

When short-range communication between the mobile terminal P and the mobile terminal 100 is not possible, the controller 180 may send an authentication signal by using the mobile communication module 112. The short-range communication may be impossible when a short-range communication module is not mounted to the mobile terminal P, when power to implement short-range communication is not supplied to the short-range communication module of the mobile terminal P, and when the short-range communication module of the mobile terminal P is located out of range of an authentication signal.

Figure 25:
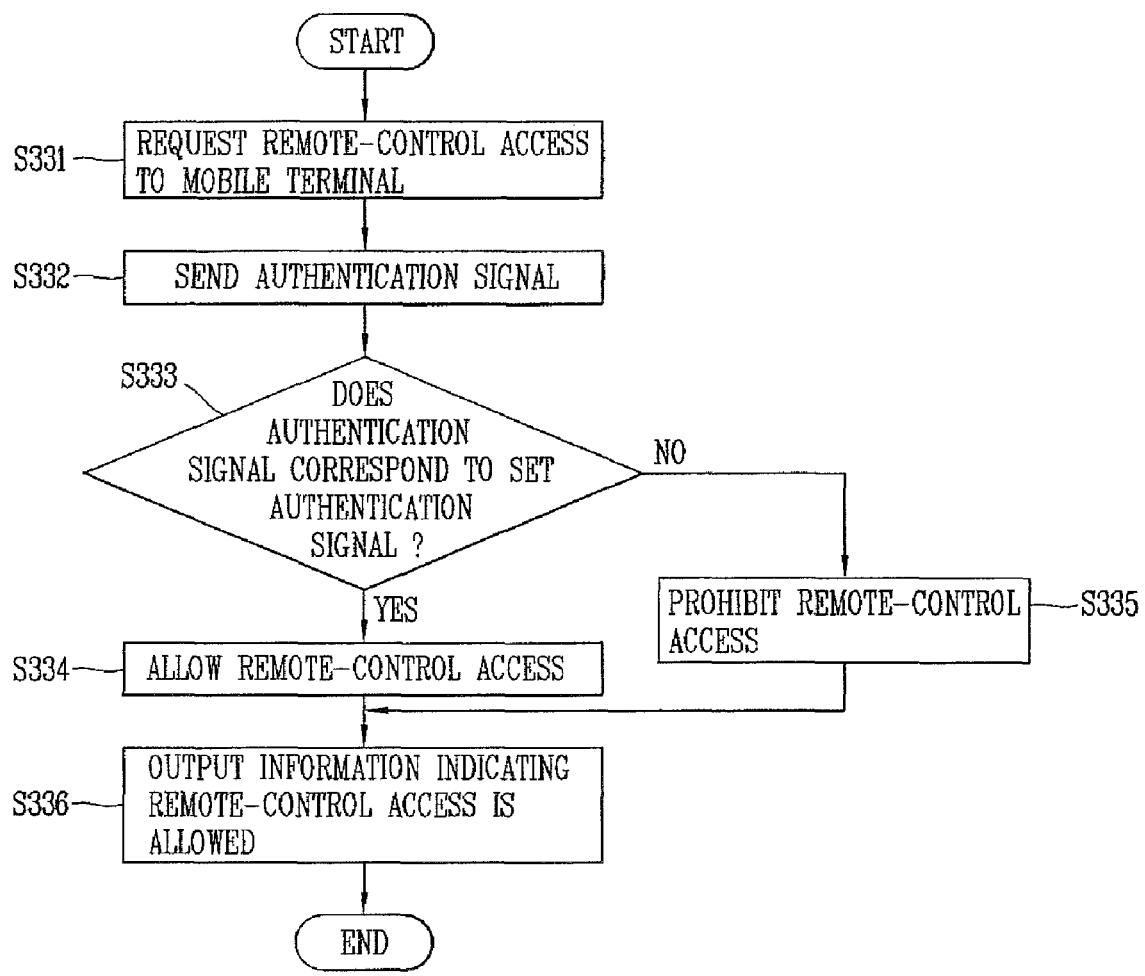
FIG. 25 is a flowchart for allowing a remote-control access using an authentication signal according to an embodiment of the present invention.

FIG. 25 is a flowchart showing allowing a remote-control access using an authentication signal according to an example embodiment of the present invention. Other operations, orders of operations and embodiments are also within the scope of the present invention.

As shown in FIG. 25, a request for remote-control access to a mobile terminal may be made in operation S331. An authentication signal may be sent in operation S332. A determination is made whether an authentication signal sent from the mobile terminal 100 corresponds with a set authentication signal in operation S333. If the two authentication signals are consistent with each other, a remote-control access is allowed in operation S334. On the contrary, if the two authentication signals do not correspond with each other, a remote-control access is not allowed in operation S335. In operation S336, information indicating that remote-control access is allowed may be output in operation S336.

FIGS. 26A and 26B are examples showing whether a remote-control access has been successfully allowed by using an authentication signal. As shown in FIGS. 26A and 26B, the display 151 of the mobile terminal 100 may display whether a remote-control access is allowed according to consistency between authentication signals in operation S336 of FIG. 25. An indication of whether the remote-control access is allowed may be output in the form of voice through the audio output module 152.

FIG. 27 is a flowchart showing a method for remote-controlling a mobile terminal according to an example embodiment of the present invention. Other operations, orders of operations and embodiments are also within the scope of the present invention.

More specifically, FIG. 27 shows that in operation S341, a request may be made for remote-control access to a mobile terminal. In operation S342, a determination may be made whether the remote-control access is allowed. If access is allowed, then in operation S343, new information may be received having an allowable remote control function among a plurality of functions executed by the mobile terminal. In operation S344, a control menu may be displayed. In operation S345, a function control signal may be sent when the control menu is selected. In operation S346, information may be received corresponding to the function control signal. Further, if remote-control access is not allowed in operation S342, then operations may end.

FIGS. 28A to 28D show control menus on a display according to an embodiment of the present invention. The control menus may correspond to the control menus discussed with respect to operation S344.

Once a remote-control access is allowed, the mobile terminal 100 may receive, through the wireless communication unit 110, menu information having an allowable remote-control function among a plurality of control functions performed by the mobile terminal P, in a connected status with the mobile terminal P in operation S343.

The menu information may include codes or signals necessary for the controller 180 to form control menus, or may indicate codes or signals to form control menus. The controller 180 may form control menus by using some or all of menu information received through the wireless communication unit 110. The menu information received through the wireless communication unit 110 may include menu information having an allowable remote-control function among a plurality of control functions. The menu information may include menu information necessary for the mobile terminal 100 to display control menus having an allowable remote-control function among control functions of the mobile terminal P.

Once the menu information is received through the wireless communication unit 110, the controller 180 may form control menus based on the received menu information, and display the control menus through the output unit in operation S344.

Figure 28A:
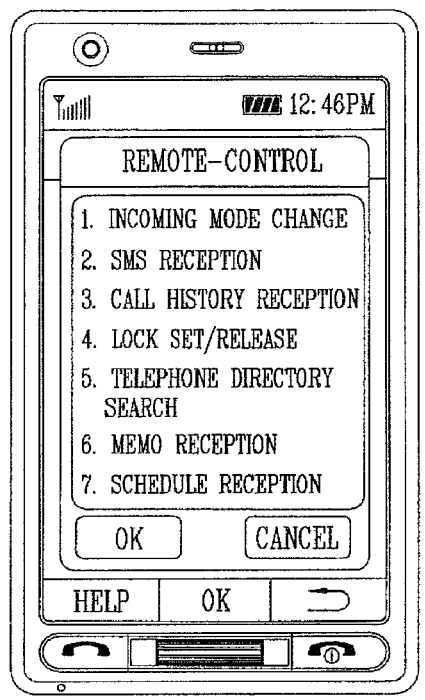
FIGS. 28A to 28D show control menus on a display according to an embodiment of the present invention.

As shown in FIG. 28A, the controller 180 may implement all the received menu information as control menus, and display the control menus on the display 151.

Figure 28B:
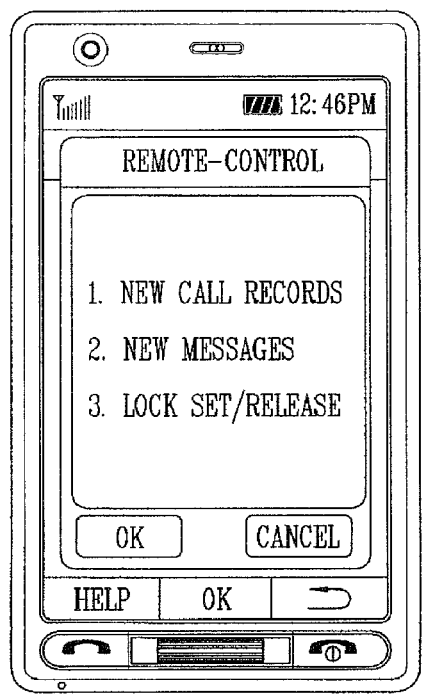

As shown in FIG. 28B, control menus set in the mobile terminal P or the mobile terminal 100 may be selectively displayed.

Figure 28C:
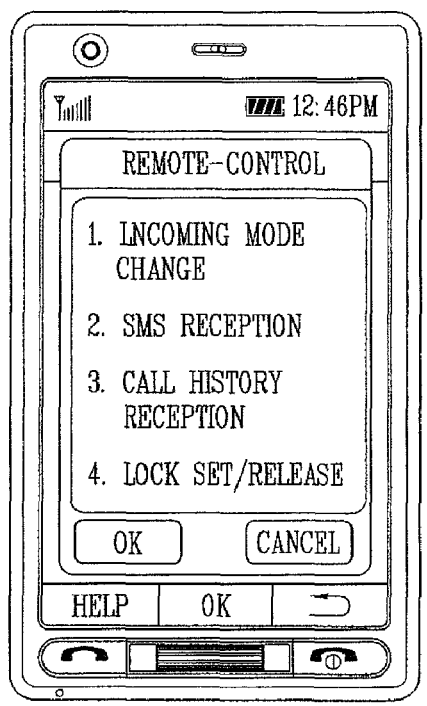

As shown in FIG. 28C, new-event related control menus having not been checked by a user may be selectively displayed. The new events may include call signal reception, message reception, key signal input, etc. each newly occurred after the user finally checks information about the mobile terminal P.

Figure 28D:
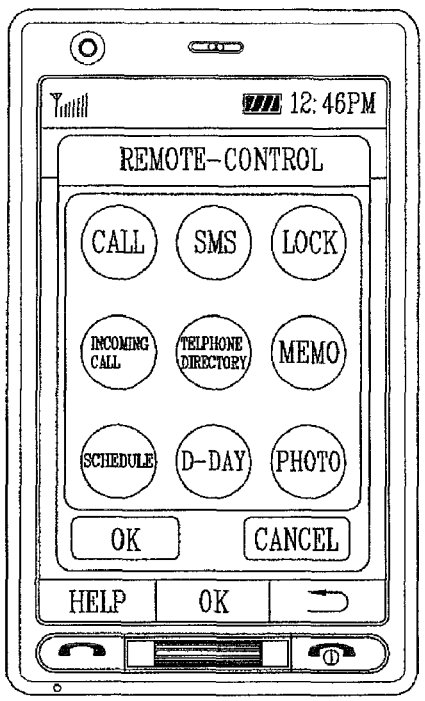

As shown in FIG. 28D, the control menus may be displayed in the form of a Graphic User Interface (GUI).

Figure 29A:
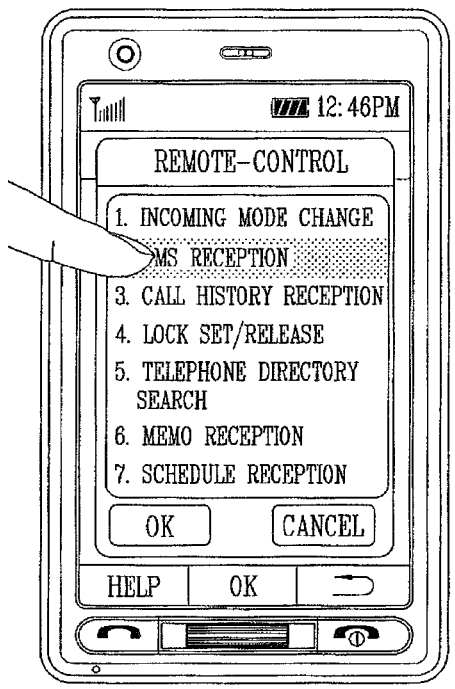
FIGS. 29A to 29C show control menus selected from displayed control menus.
Figure 29B:
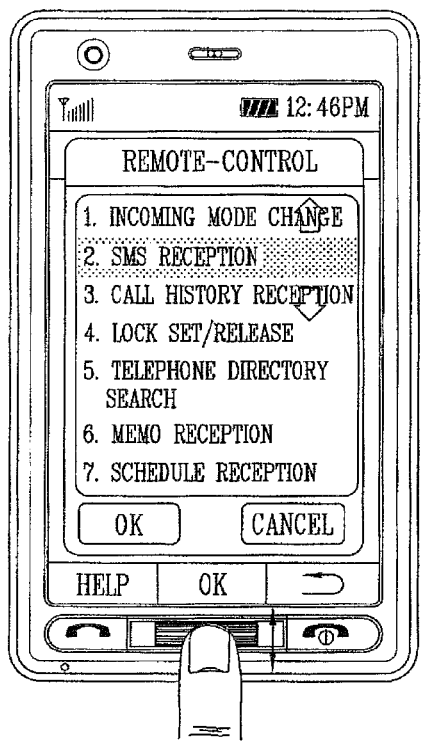
Figure 29C:
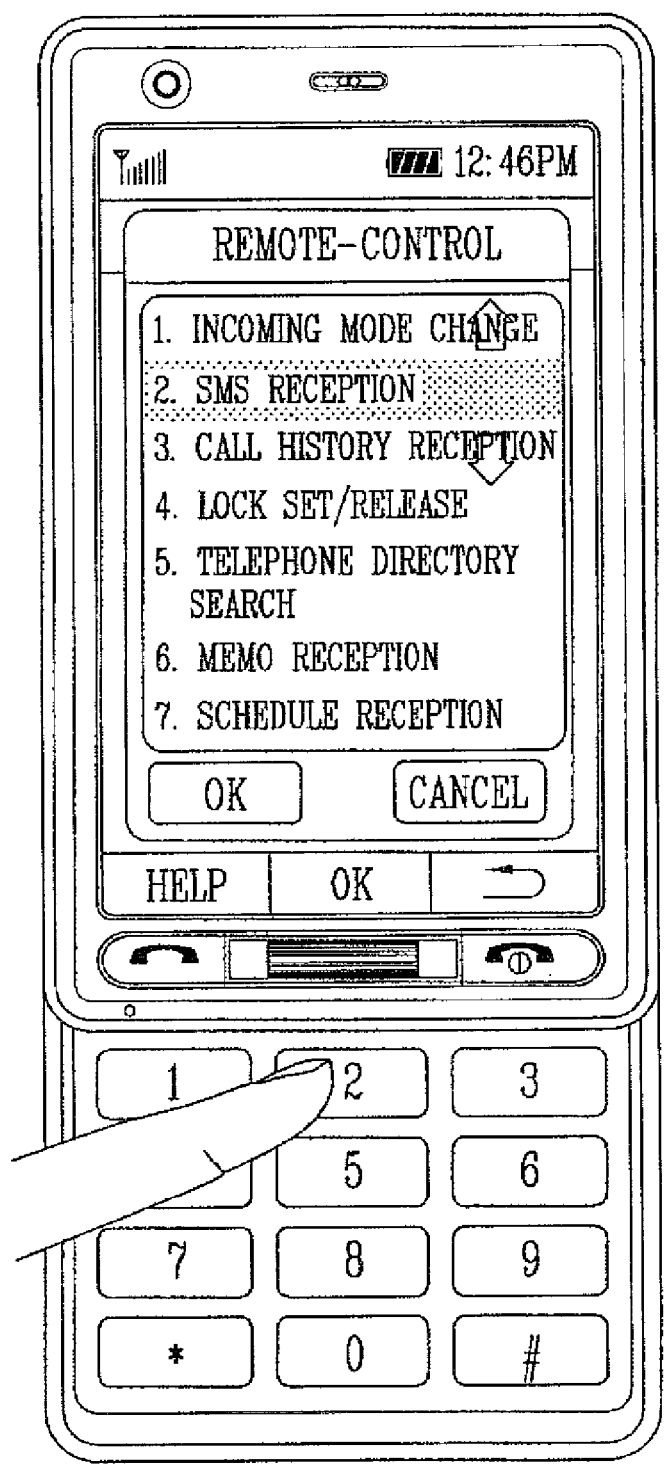

FIGS. 29A to 29C show control menus selected from displayed control menus.

Once control menus are displayed in operation S344 (of FIG. 27), a user may manipulate the user input unit 130 to select one or more control menus among the displayed control menus. As shown in FIG. 29A, the control menus may be selected by a user in a touch manner. As shown in FIG. 29B, the control menus may be selected by a user in a jog dial input manner. As shown in FIG. 29C, the control menus may be selected by a user in a keypad input manner.

Once a specific control menu is selected from the displayed control menus, the controller 180 may generate a function control signal and send the function control signal to the mobile terminal P through the wireless communication unit 110 in operation S345.

FIGS. 30A to 30D show control functions corresponding to selected control menus (and the function control signal). The function control signal may be associated with a control function for the mobile terminal P. The control function may include a function to change a status of the mobile terminal P, a function to edit/delete or send data stored in a memory of the mobile terminal P, a function to initialize the memory of the mobile terminal P, a function to send position-information of the mobile terminal P, a function to set an automatic response function of the mobile terminal P, a function to send a short message to be later received in the mobile terminal P, a function to convert an incoming call, a function to control peripheral devices rather than the mobile terminal P through the mobile terminal P, etc.

The function to change a status of the mobile terminal P may include a function to change an incoming mode of the mobile terminal P, a function to change an incoming volume of the mobile terminal P, a function to activate and deactivate a camera mounted to the mobile terminal P, a function to change a capturing direction of the camera of the mobile terminal P, a function to activate and deactivate a microphone mounted to the mobile terminal P, a function to change a lighting status of a display of the mobile terminal P, a function to activate and deactivate a position-information module of the mobile terminal P, a function to activate and deactivate a user input unit of the mobile terminal P, a function to activate and deactivate a broadcasting reservation-recording function, a function to control other external devices using the mobile terminal P, a function to set a status of a messenger of the mobile terminal P, etc.

Data stored in the memory of the mobile terminal P may include telephone directory data, multimedia content data, incoming/outgoing and missing calls data, schedule data, memo data, voice mail data, visual voice mail data, web favorites data, and broadcasting schedule data.

The multimedia content data may include photo data, moving image data, music data, and/or broadcasting-recorded data.

Figure 30A:
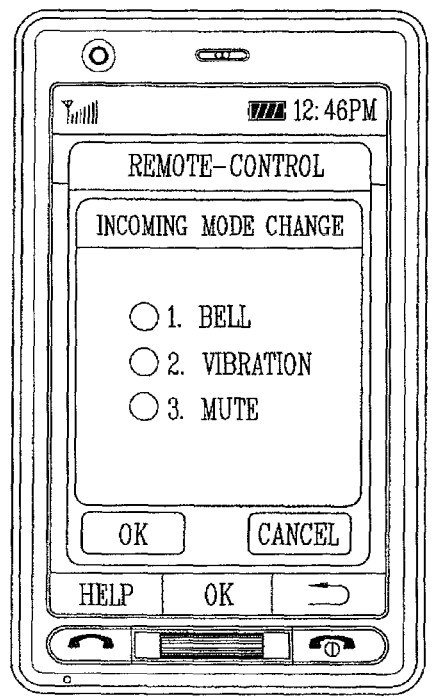
FIGS. 30A to 30E show control functions corresponding to selected control menus.

As shown in FIG. 30A, the remote-control function may be an incoming mode change function. Once a bell sound mode is selected from menus displayed in FIG. 30A, an incoming call mode may change into a bell sound.

Figure 30B:
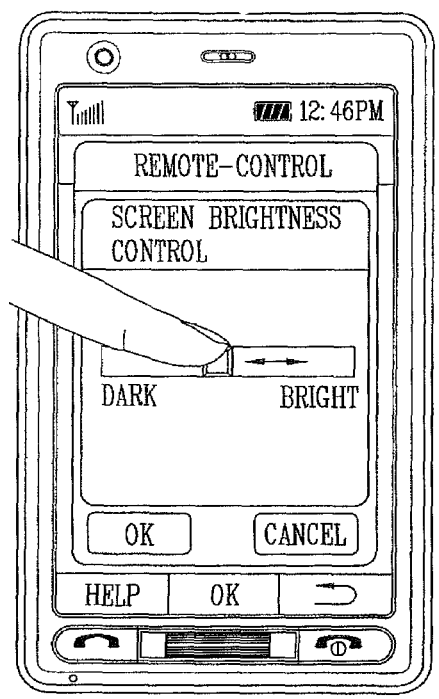

As shown in FIG. 30B, the remote-control function may be a function to change a lighting status of the display of the mobile terminal P. When a user touches a bright control button to drag it in right and left directions, the display of the mobile terminal P may have its brightness controlled. As the brightness of the display is controlled, power consumption of a battery of the mobile terminal P may be reduced.

Figure 30C:
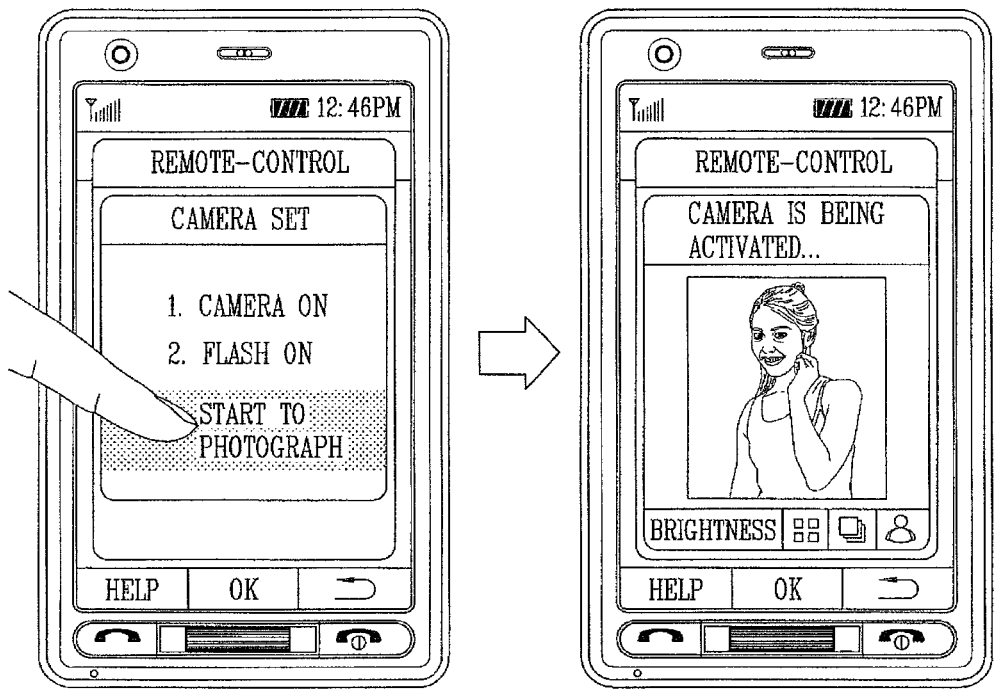

As shown in FIG. 30C, the remote-control function may be a camera activation/deactivation function, and a camera control function. Once a photograph starting menu is touched from among the control menus shown in FIG. 30C, a camera of the mobile terminal P may be operated. Then, a photographing direction, a flash level, etc. may be controlled.

As shown in FIG. 30C, the remote-control function may be a function to edit/delete or send data stored in the memory of the mobile terminal P.

Figure 30D:
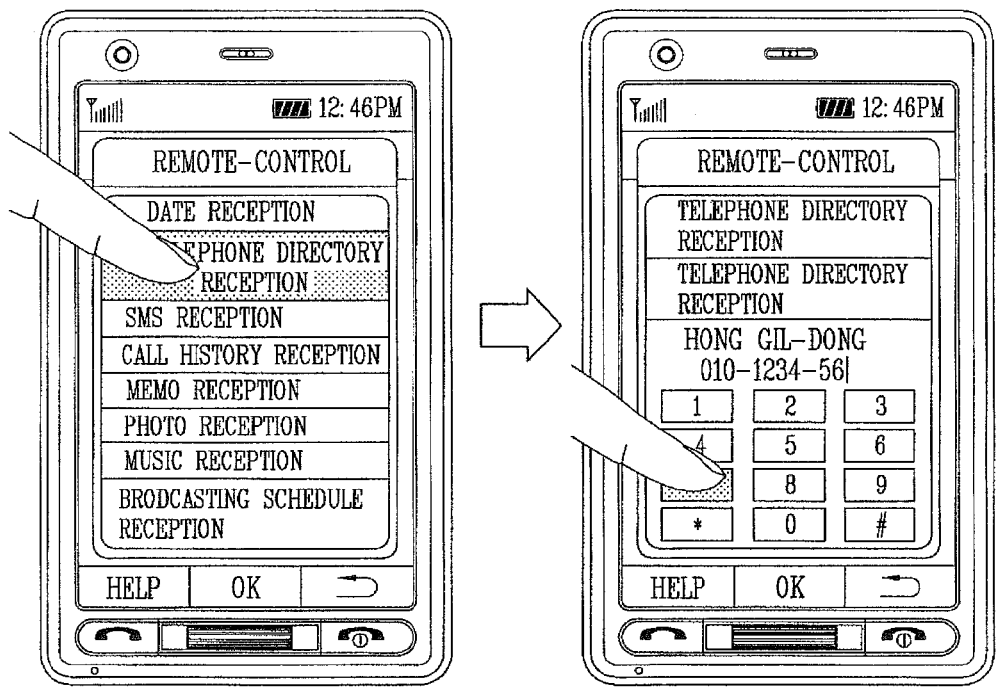
Figure 30E:
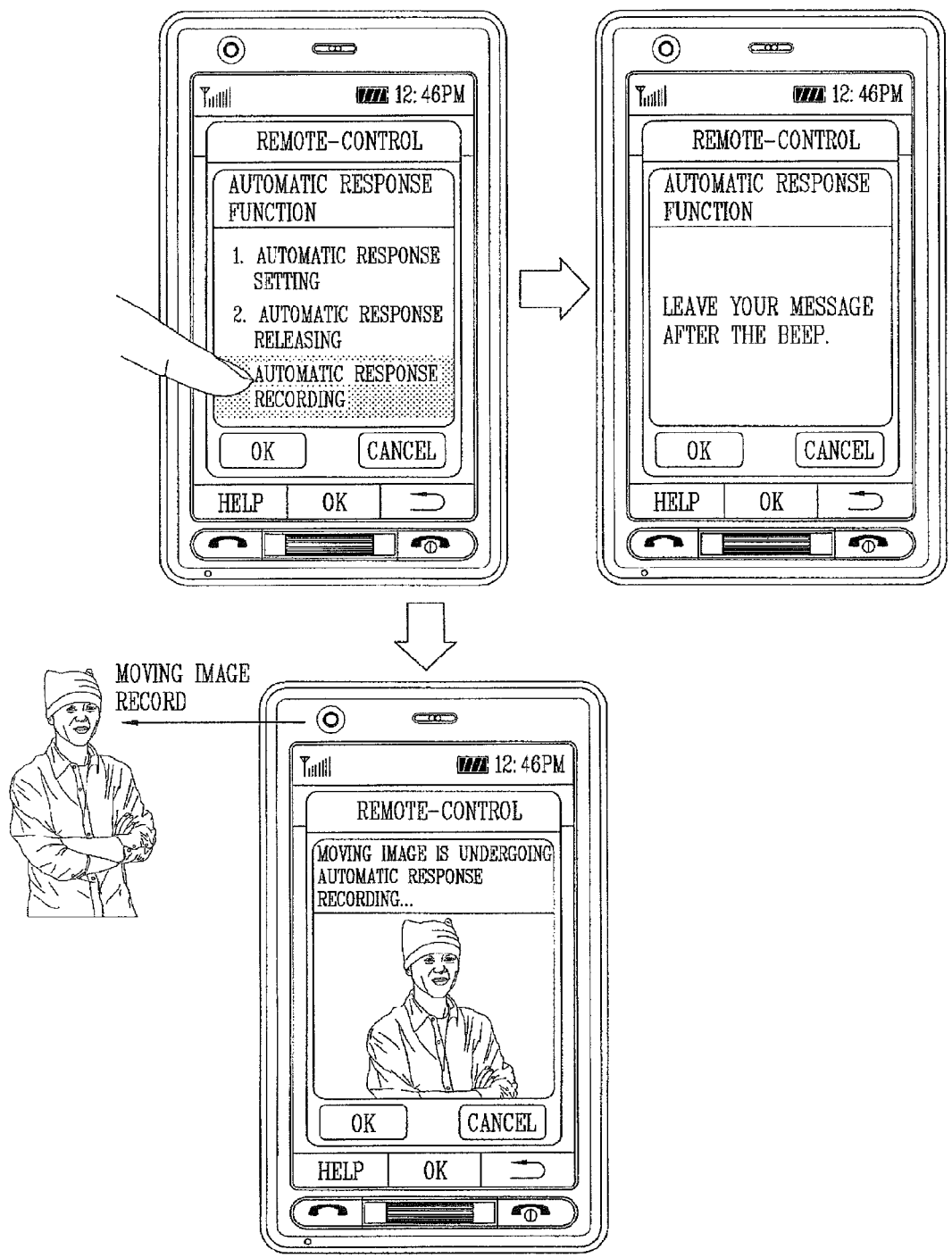

As shown in FIG. 30D, once a user selects 'telephone directory reception', a telephone directory stored in the memory of the mobile terminal P may be sent to the mobile terminal 100. If the user selects an 'edit' button, contents of the telephone directory may be edited or deleted.

The remote-control function may be a function to set an automatic response. Once the user selects an automatic response setting menu and an automatic response recording menu, an automatic response message to be output at the time of a call connection to the mobile terminal P may be set. The automatic response message may be a voice message or moving image data.

As shown in FIG. 27, when the mobile terminal P sends information relating to the generated control signal, the mobile terminal 100 may receive the information through the wireless communication unit 110 in operation S346. The information relating to the control signal may include an acknowledgement signal indicating that the mobile terminal P has received a control signal from the mobile terminal 100, an acknowledgement signal indicating that the mobile terminal P has performed a control function corresponding to the control signal received from the mobile terminal 100, a signal including information sent to the mobile terminal 100 from the mobile terminal P in correspondence with the control signal received from the mobile terminal 100, etc. Information sent to the mobile terminal 100 may include a list of incoming/outgoing calls stored in the mobile terminal P, a telephone directory list, received short messages, short messages and incoming calls received in the mobile terminal P, photo data, audio data, schedule data, voice mail data, visual voice mail data, memo data, etc.

Figure 31:
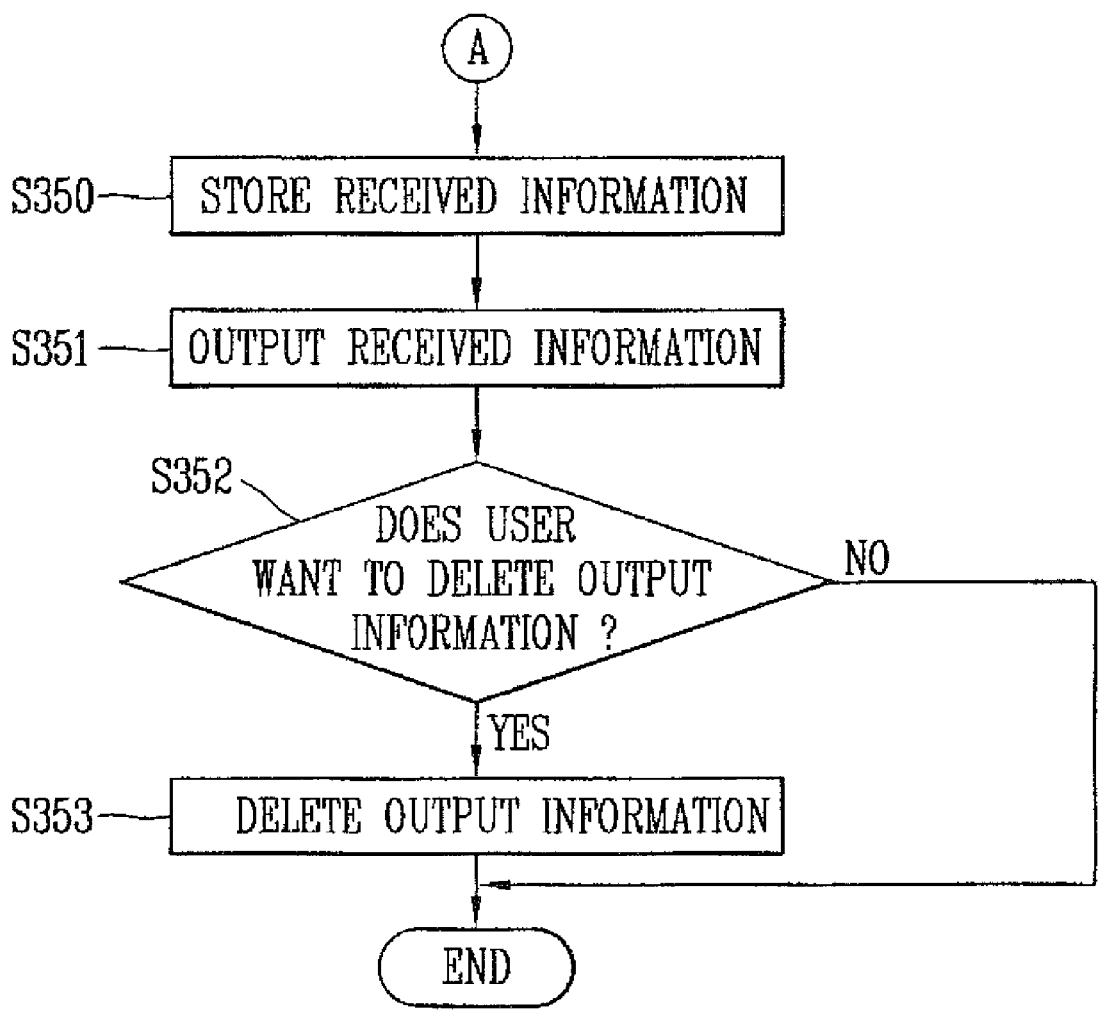
FIG. 31 is a flowchart for storing/deleting information relating to a control signal received from a mobile terminal (remote-controlled terminal) into/from a memory of a mobile terminal (remote-controlling terminal)

FIG. 31 is a flowchart showing storing/deleting information relating to a control signal received from the mobile terminal P into/from a memory of the mobile terminal 100.

Once information relating to the control signal is received through the wireless communication unit 110 of the mobile terminal 100 (from operation S346 of FIG. 27), the information may be stored in the memory 160 of the mobile terminal 100 in operation S350. The information may be stored in an additional memory region. In order to access the additional memory region, an additional authentication key (or code) may be set.

The information stored in the mobile terminal 100 may be output through the output unit 150 in operation S351. The controller 180 of the mobile terminal 100 may determine whether to delete the output information based on a user's input through the user input unit 130 in operation S352. As a result of the determination, the controller 180 may delete the output information in operation S353.

Figure 32:
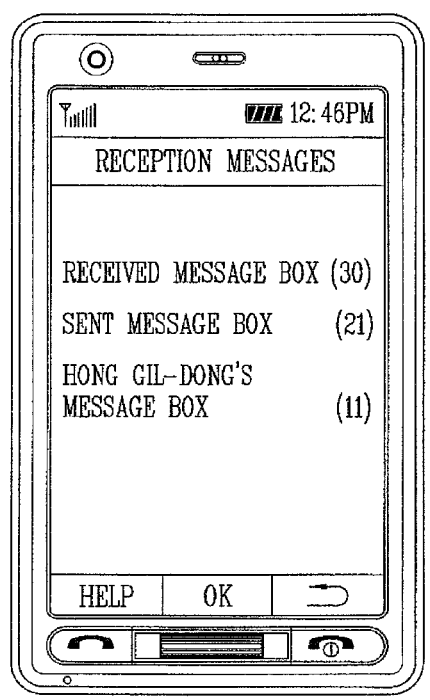
FIGS. 32 and 33 show storing information relating to a control signal received from a 'remote-controlled' mobile terminal in a 'remote-controlling' mobile terminal.
Figure 33:
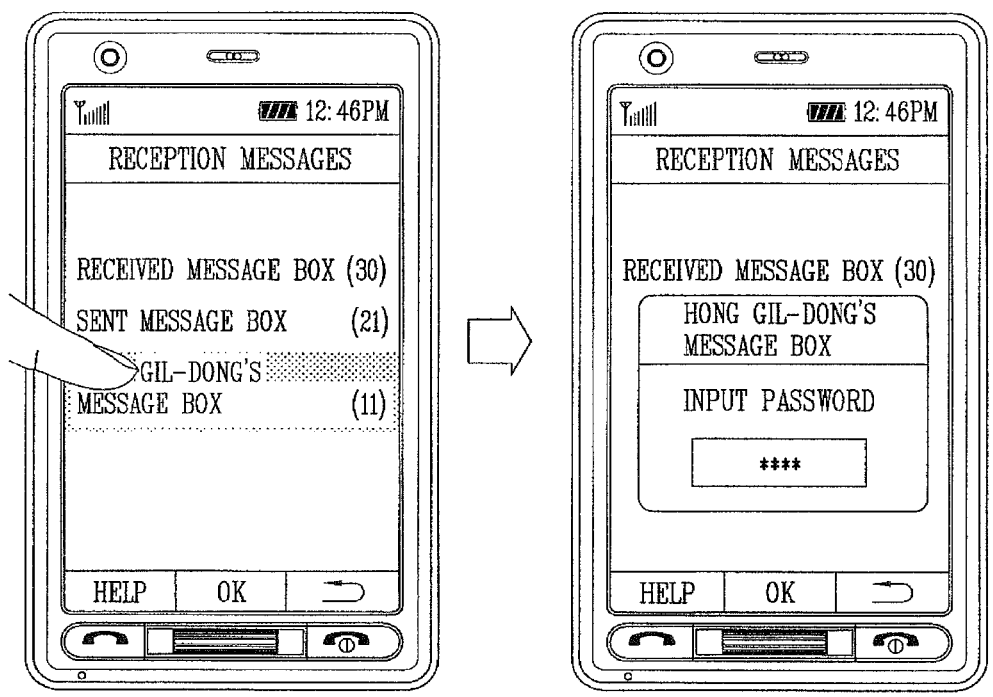

FIGS. 32 and 33 show storing information relating to a control signal received from the mobile terminal P in the mobile terminal 100. As shown in FIG. 32, the mobile terminal 100 may store information relating to a control signal received from the mobile terminal P in the memory 160 (in operation S350 of FIG. 31). The information relating to a control signal may be stored in an additional memory region.

As shown in FIG. 32, the additional memory region may be implemented in the form of a folder. In FIG. 33, 'Hong Gil-Dong's message box' may indicate an additional folder to store information received from the mobile terminal P.

FIG. 33 shows an example of setting an additional authentication key (or code) to allow access to the additional memory region. As shown in FIG. 33, an additional authentication key (or code) may be input to access the additional memory region. In FIG. 33, the authentication key (or code) may be implemented in the form of a password. The authentication key (or code) may also be implemented in the form of voice data, human's body recognition data (e.g., fingerprint data, eyeball recognition data, etc.), a user's touch, etc. Unless a user does not set an additional authentication key (or code), the additional authentication key (or code) may be set to be equal to the authentication key (or code) to access the mobile terminal P.

Figure 34:
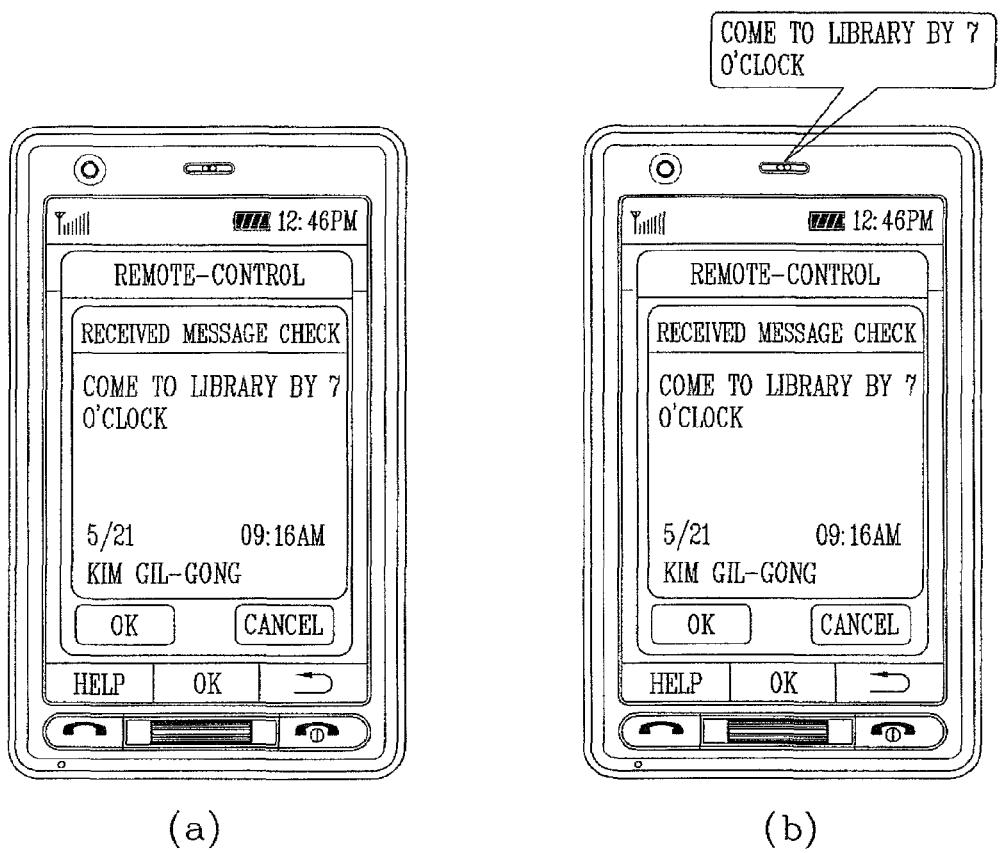
FIGS. 34A and 34B show an example of displaying information relating to a control signal received from a 'remote-controlled' mobile terminal on an output unit of a 'remote-controlling' mobile terminal.

FIGS. 34A and 34B show an example of displaying information relating to a control signal received from the mobile terminal P on an output unit of the mobile terminal 100.

Information relating to a control signal may be displayed through the output unit 150 (in operation S351 of FIG. 31). As shown in FIGS. 34A and 34B, the information relating to a control signal may be visually output on the display 151, or may be output in the form of voice through the voice output module 152.

Figure 35:
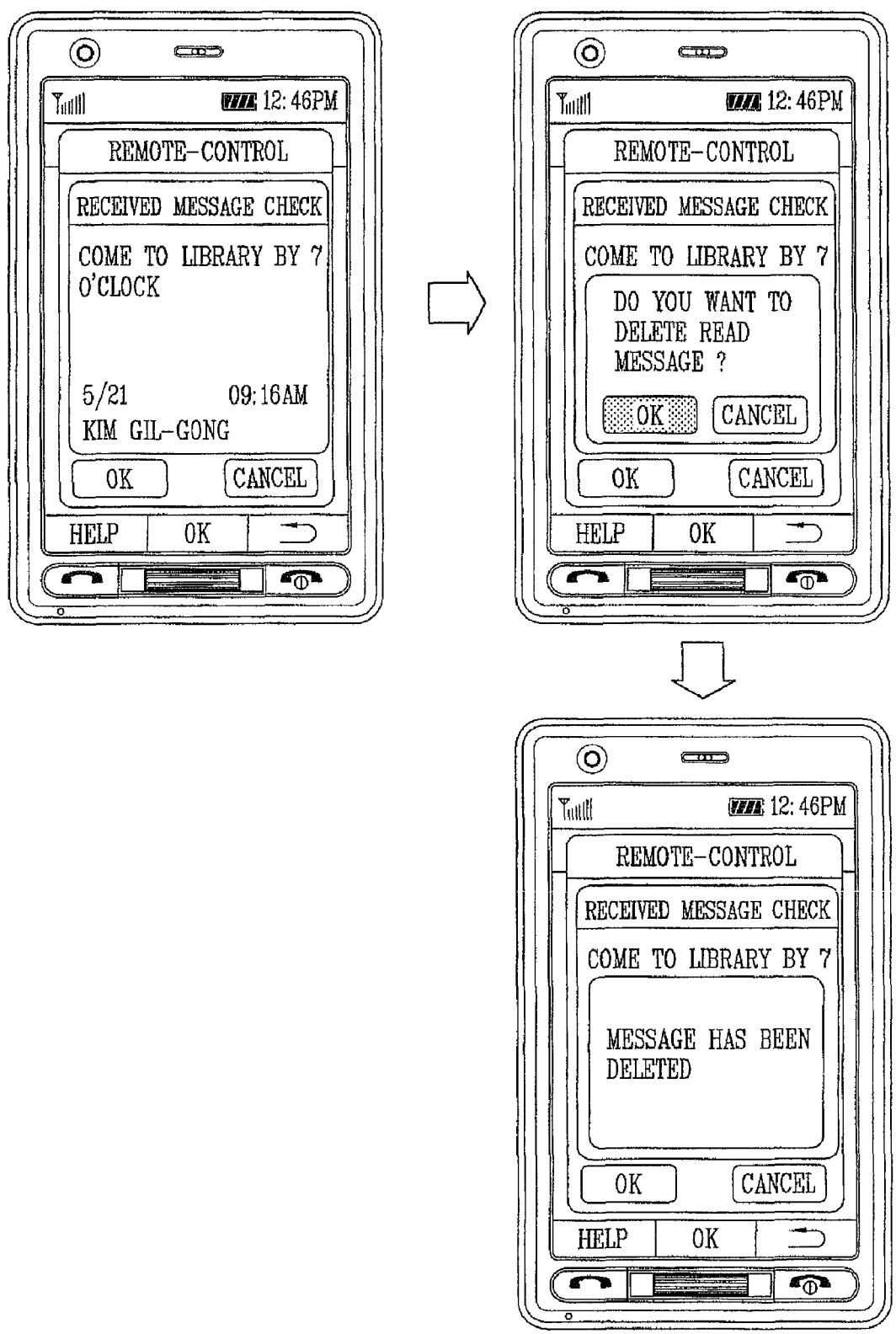
FIG. 35 show an example of deleting output information.

FIG. 35 shows an example of deleting output information.

Information output through the output unit 150 may be deleted in the memory 160 (in operation S353 of FIG. 31). A decision whether to delete output information may be determined by the controller 180 based on a user's input in operation S352. More specifically, when a user wants to delete output information, the output information may be completely deleted from the memory 160.

FIG. 35 illustrates the controller 180 determining whether to delete output information based on a user's input in operation S352. However, the output information may be automatically deleted without undergoing operation S352.

Figure 36:
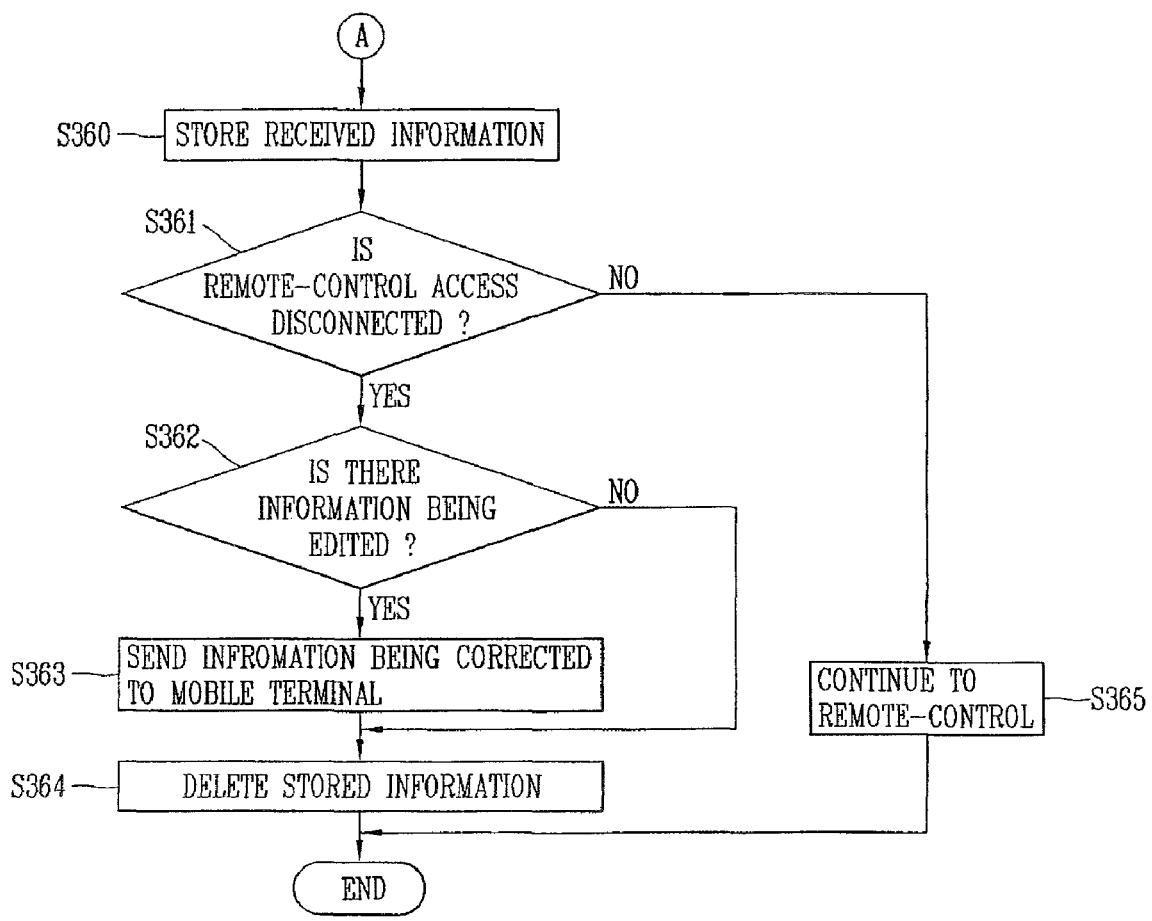
FIG. 36 is a flowchart showing operation of a controller when a remote-control access is disconnected in a remote-control mode.
Figure 37:
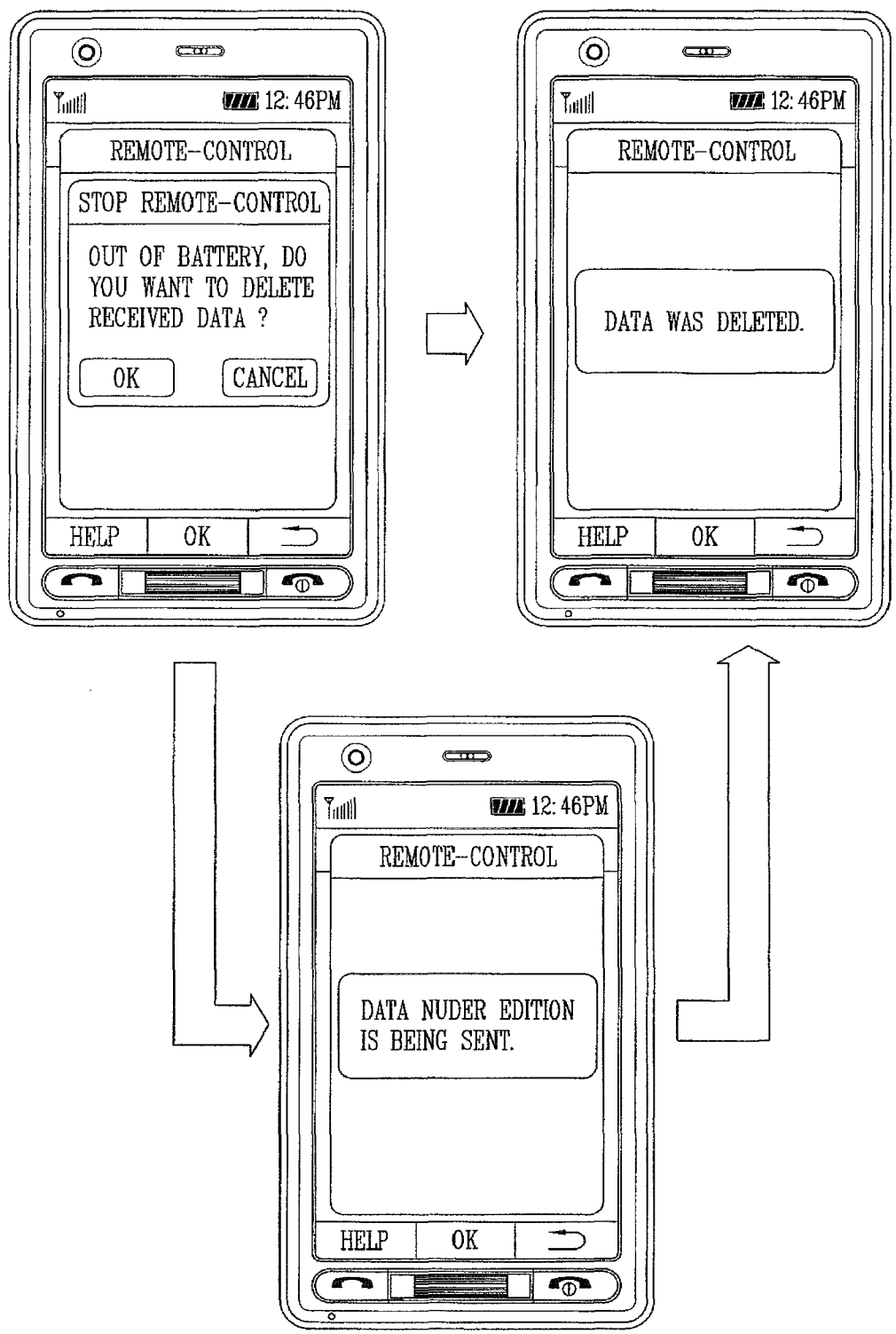
FIG. 37 is a view showing sending and deleting data when a remote-control access is disconnected in a remote-control mode.

FIG. 36 is a flowchart showing operation of a controller when a remote-control access is disconnected in a remote-control mode. FIG. 37 is a view showing sending and deleting data when a remote-control access is disconnected in a remote-control mode.

As shown in FIG. 36, received information may be stored in operation S360. A determination may be made in operation S361 regarding whether remote-control access is disconnected. When a remote-control mode is disconnected due to unstable connection of the wireless communication unit 110, or due to power supplied to the mobile terminal P with an amount too insufficient to enable wireless communication, etc., the controller may determine whether information being currently corrected exists in operation S362.

If there is data being currently corrected in operation S362, the controller 180 may send the data to the mobile terminal P through the wireless communication unit 110, and store the data in operation S363. Information stored in the memory 160 of the mobile terminal 100 may be deleted in operation S364.

If there is no data currently being corrected in operation S362, the controller 180 may delete information stored in the memory 160 of the mobile terminal 100 without sending a signal to the mobile terminal P in operation S364.

Figure 38:
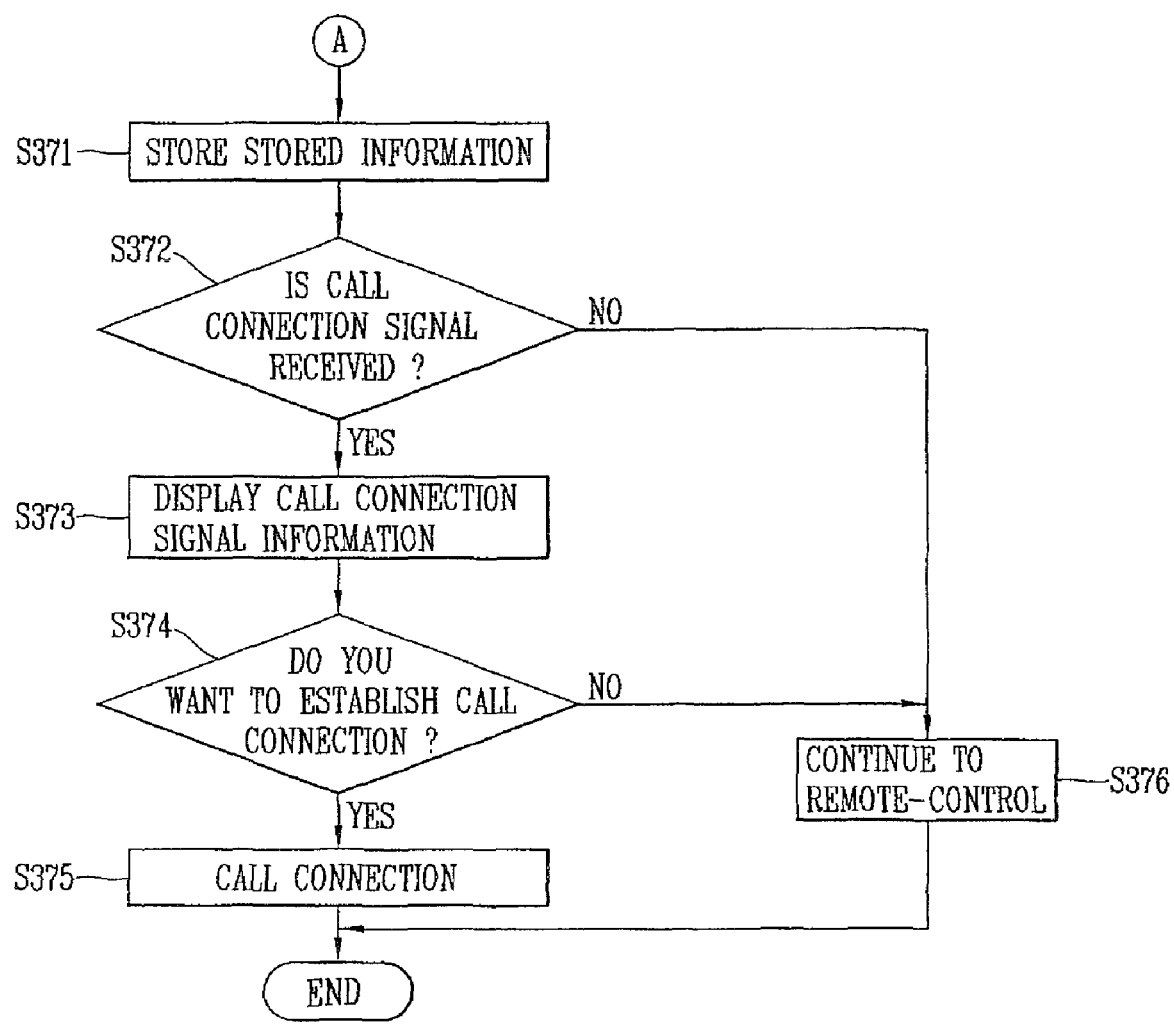
FIG. 38 is a flowchart showing a method for remote-controlling a 'remote-controlled' mobile terminal when the a 'remote-controlling' mobile terminal receives a call connection signal in a remote-control mode.
Figure 39:
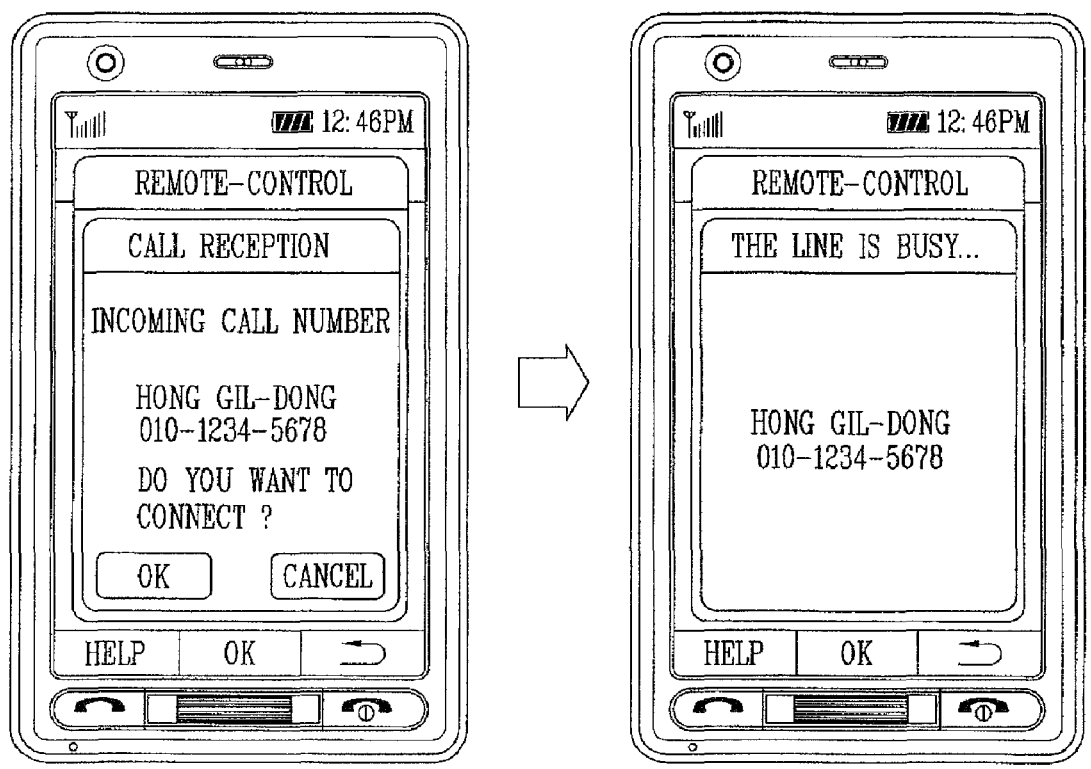
FIG. 39 shows a call connection being established while a 'remote-controlling' mobile terminal receives a call connection signal in a remote-control mode.

FIG. 38 is a flowchart showing a method for remote-controlling the mobile terminal P while the mobile terminal 100 receives a call connection signal in a remote-control mode. FIG. 39 shows a call connection being established when the mobile terminal 100 receives a call connection signal in a remote-control mode.

When a call connection signal is received in operation S372, from a third party, etc., to the mobile terminal 100 in a remote-control mode, the controller 180 may display the call connection signal received from the mobile terminal P through the output unit 150 in operation S373. The controller 180 may determine whether to establish a call connection between the third party's mobile terminal and the mobile terminal 100 based on a user's input through the user input unit 130 in operation S374. If the user wants to connect a call with the third party, the controller 180 may connect a call between the user and the third party in operation S375. On the other hand, if the user does not want to connect a call with the third party, the controller 180 may continue to perform the remote-control process in operation S376.

Embodiments of the present invention may provide a mobile terminal capable of being remote-controlled, and a method for remote-controlling thereof.

Embodiments of the present invention may provide a mobile terminal capable of being remote-controlled by its owner or an allowable person when the mobile terminal is not possessed by its owner, and a method for remote-controlling thereof.

Embodiments of the present invention may provide a mobile terminal capable of being differently remote-controlled according to a received function control signal, and a method for remote-controlling thereof.

A method may be provided for remote-controlling a mobile terminal. This may include allowing a condition for entering a remote-control mode to be set, and entering the remote-control mode when a call connection request is received and the call connection request corresponds with the set condition. The method may also include receiving a function control signal in the entered remote-control mode and performing a remote-control function corresponding to the received function control signal.

The condition for entering a remote-control mode may include at least one of a set frequency (number of times)/time of the call connection request, repetitive reception of a same sender's number, reception of a set sender's number, and reception of a call connection request including an authentication key (or code).

The method may further include receiving an authentication key to determine an access right of another party requesting the call connection before or after receiving the function control signal.

The remote-control functions may include a data management function, a control function, a status informing function, a remote monitoring function, an inducement function and an informing function. The control function may be for an incoming sound including a bell sound. The status informing function may inform that the mobile terminal has been lost. The remote monitoring function may send information about a position where the mobile terminal is placed and/or peripheral situations. The inducement function may induce the mobile terminal to return to a person relating to a set number. The informing function may inform a person requesting a call connection of a call connection to the set number.

The receiving of a function control signal and performing a remote-control function may be executed a plurality of times, and the remote-control function may be executed a different plurality of times.

A method for remote-controlling a mobile terminal may also include requesting a mobile terminal to enter a remote-control mode, receiving menu information relating to a remote-control function among a plurality of control functions performed by the mobile terminal, under an accessed status to the mobile terminal, and displaying control menus relating to the menu information. The method may also include sending a function control signal to the mobile terminal when one or more control menus are selected from the displayed control menus.

A mobile terminal may be provided that includes a wireless communication unit for sending/receiving a wireless signal for a call connection, a memory for storing a condition for entering a remote-control mode, a user input unit for receiving a command to set the condition, and a controller for performing a remote-control mode when a call connection request is received and the call connection request corresponds with the set condition. The controller may further perform a remote-control function corresponding to a function control signal received in the remote-control mode.

The mobile terminal may include a camera, a microphone, a position information module, an audio (or sound) output module, a display, etc. for inputting/outputting information according to the alarm control function and the informing function.

A mobile terminal may be provided that includes a wireless communication unit for receiving, from the mobile terminal, menu information having an allowable remote-control function among a plurality of control functions executed by the mobile terminal, and sending a function control signal. The mobile terminal may also include a controller for requesting the mobile terminal to enter a remote-control mode, constituting control menus by processing the received menu information, and when one control menu is selected from the control menus, generating and sending a function control signal. Still further, the mobile terminal may also include an output unit for displaying the control menus.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for remote-controlling a mobile terminal, the method comprising:
setting a condition for the mobile terminal to enter a remote-control mode;
storing the set condition and a separate authentication key in a memory of the mobile terminal;
receiving a call connection request at the mobile terminal;
entering the remote-control mode of the mobile terminal when the call connection request is received at the mobile terminal and the call connection request corresponds to the set condition, wherein the condition for entering the remote-control mode of the mobile terminal includes at least one of a predetermined duration of the call connection request, a repetitive reception of a same sender's number or reception of a predetermined sender's number, the remote-control mode of the mobile terminal allowing a plurality of remote control functions for the mobile terminal;
after the mobile terminal enters the remote-control mode, the mobile terminal requests an authentication key;
after receiving the requested authentication key, determining that the received authentication key corresponds to the stored authentication key, wherein the received authentication key includes a touch pattern, information of a human body, voice, or visual operations;

receiving a function control signal while the mobile terminal is in the entered remote-control mode and after the received authentication key is determined to correspond to the stored authentication key; and performing a remote-control function that corresponds to the received function control signal.

2. The method of claim 1, further comprising sending, to a call-connected other terminal, an indication that the mobile terminal has entered the remote-control mode.

3. The method of claim 1, wherein the function control signal is implemented as at least one of dual tone multi frequency (DTMF), packet data, a short message, or voice data.

4. The method of claim 1, wherein the authentication key determines an access right of a person or terminal that provides the authentication key.

5. The method of claim 1, wherein when the received authentication key does not correspond with the stored authentication key, the method further comprises outputting an audio or video response to indicate no authentication, or disconnecting the connected call.

6. The method of claim 1, wherein performing the remote-control function includes performing an alarm control function to inform that the call connection request was received at the mobile terminal.

7. The method of claim 6, wherein performing the alarm control function includes performing at least one of a function to provide a bell sound or a vibration from the mobile terminal, or a function to provide a flash from the mobile terminal.

8. The method of claim 1, wherein performing the remote-control function includes performing a data management function to control data relating to the mobile terminal.

9. The method of claim 8, wherein performing the data management function includes performing at least one of a function to store data in the mobile terminal, a function to send data in the mobile terminal to another mobile terminal providing the call connection request, a function to delete data in the mobile terminal, a function to initialize the mobile terminal, or a function to set/release locking of the mobile terminal.

10. The method of claim 1, wherein performing the remote-control function includes performing an informing function to inform that the mobile terminal is in a lost status.

11. The method of claim 1, wherein performing the remote-control function includes performing a remote monitoring function to provide information about a location of the mobile terminal, or to provide information about a peripheral situation of the mobile terminal using a camera and/or a microphone of the mobile terminal.

12. The method of claim 11, wherein performing the remote monitoring function includes vibrating the mobile terminal.

13. The method of claim 11, wherein when the camera is activated, a capturing direction of the camera varies, or a flash of the mobile terminal is activated.

14. The method of claim 1, wherein performing the remote-control function includes performing an inducement function to induce a person having the mobile terminal to return the mobile terminal, wherein the inducement function provides a display message or provides the mobile terminal in an open position.

15. The method of claim 14, wherein the inducement function displays a request for a call connection to a specific phone number.

16. The method of claim 15, further comprising the mobile terminal discarding one or more user's input when the call connection is requested.

17. The method of claim 1, wherein performing the remote-control function includes performing a guiding function to inform a person providing the call connection request of a call connection to a predetermined phone number or a received phone number.

18. The method of claim 17, wherein the guiding function informs a person providing the call connection request of the phone number, or forwards the person's call connection request to another mobile terminal.

19. The method of claim 1, wherein the call connection is established through at least one of a mobile communication network or an Internet Protocol (IP)-based wireless communication network.

20. The method of claim 1, wherein receiving the function control signal and performing the remote-control function are performed a plurality of times.

21. The method of claim 20, wherein each performed remote-control function is different from a previously performed remote control function.

22. The method of claim 1, further comprising:
providing information relating to allowable remote-control functions to another mobile terminal, and wherein the received function control signal is received from the another mobile terminal based on a selected one of the allowable remote-control functions provided to the another mobile terminal.

23. A mobile terminal comprising:
a wireless communication unit for sending/receiving a wireless signal for a call connection;
a user input unit for receiving a command to set a condition to enter a remote-control mode;
a memory for storing the set condition to enter the remote-control mode and for storing an authentication key; and
a controller for the mobile terminal to enter the remote-control mode when a call connection request is received and the call connection request corresponds with the set condition stored in the memory, wherein the condition for the mobile terminal entering the remote-control mode includes at least one of a predetermined duration of the call connection request, a repetitive reception of a same sender's number or reception of a predetermined sender's number, the remote control mode of the mobile terminal allowing a remote control function for each of a plurality of elements of the mobile terminal, the controller to request an authentication key after the mobile terminal enters the remote-control mode, wherein after receiving the requested authentication key, the controller determines that the received authentication key corresponds to the stored authentication key, wherein the received authentication key includes a touch pattern, information of a human body, voice, or visual operations, and the controller to perform a remote-control function corresponding to a function control signal received while the mobile terminal is in the remote-control mode and after the controller determines that the received authentication key corresponds to the stored authentication key.

24. The mobile terminal of claim 23, further comprising an audio output module or a display for outputting at least one of audio information and video information for a call connection request to the mobile terminal in a different manner from information set by the remote-control function, or for outputting at least one of video information and/or audio information relating to a lost status of the mobile terminal.

25. The mobile terminal of claim 23, wherein the user input unit is electrically connected to the controller, and the user input unit receives data relating to the mobile terminal.

26. The mobile terminal of claim 23, further comprising a microphone or a camera for obtaining video information or audio information about a location of the mobile terminal when the mobile terminal is in the remote-control mode.

27. The mobile terminal of claim 23, further comprising a display for displaying visual information, wherein the display does not output visual information relating to a remote-control function being currently performed.

28. A method comprising:
setting a condition for a mobile terminal to enter a remote-control mode;
storing the set condition in a memory of the mobile terminal;
receiving a call connection request at the mobile terminal;
entering the remote-control mode of the mobile terminal when the call connection request is received at the mobile terminal and the call connection request corresponds to the set condition, wherein the condition for the mobile terminal to enter the remote-control mode includes a predetermined duration of the call connection request or a repetitive reception of a same sender's number, the remote-control mode of the mobile terminal allowing a plurality of remote control functions;
after the mobile terminal enters the remote-control mode, the mobile terminal requests an authentication key;
after receiving the requested authentication key, determining that the received authentication key corresponds to the stored authentication key, wherein the received authentication key includes a touch pattern, information of a human body, voice, or visual operations;
receiving a function control signal when the mobile terminal is in the entered remote-control mode and after the received authentication key is determined to correspond to the stored authentication key; and
performing, at the mobile terminal, a remote-control function that corresponds to the received function control signal when the mobile terminal is in the entered remote-control mode.

29. The method of claim 28, wherein performing the remote-control function includes performing an informing function to inform that the mobile terminal is in a lost status.

30. The method of claim 28, wherein performing the remote-control function includes performing a remote monitoring function to provide information regarding a location of the mobile terminal.

31. The method of claim 28, wherein performing the remote-control function includes providing information about a peripheral situation of the mobile terminal using a camera and/or a microphone of the mobile terminal.

32. The method of claim 28, wherein performing the remote monitoring function includes vibrating the mobile terminal.

33. The method of claim 28, wherein performing the remote-control function includes performing a guiding function to inform a person providing the call connection request of a call connection to a predetermined phone number or a received phone number.

* * * * *